(12) United States Patent
Baliga et al.

(10) Patent No.: US 8,750,110 B2
(45) Date of Patent: Jun. 10, 2014

(54) AUTOMATIC PATH SELECTION FOR HYBRID COMMUNICATION NETWORKS

(75) Inventors: Roshan R. Baliga, Bangalore (IN); Etan G. Cohen, San Francisco, CA (US); Michael B. Ryan, Los Gatos, CA (US); Sidney B. Schrum, Jr., Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 13/339,847

(22) Filed: Dec. 29, 2011

(65) Prior Publication Data

US 2012/0320919 A1  Dec. 20, 2012

Related U.S. Application Data

(60) Provisional application No. 61/498,250, filed on Jun. 17, 2011, provisional application No. 61/498,206, filed on Jun. 17, 2011.

(51) Int. Cl.
*H04L 12/28* (2006.01)
*G06F 15/16* (2006.01)

(52) U.S. Cl.
USPC ... 370/230.1; 370/232; 370/235; 370/395.21; 709/235

(58) Field of Classification Search
USPC ............ 370/431–463, 89–402; 709/223–226, 709/230–244
See application file for complete search history.

(56) References Cited

U.S. PATENT DOCUMENTS

| 6,222,822 | B1 * | 4/2001 | Gerardin et al. ............. 370/230 |
| 6,493,331 | B1 | 12/2002 | Walton et al. |
| 6,744,768 | B2 * | 6/2004 | Vikberg et al. .......... 370/395.21 |
| 6,952,401 | B1 * | 10/2005 | Kadambi et al. .............. 370/232 |
| 7,039,715 | B2 | 5/2006 | England et al. |
| 7,047,310 | B2 * | 5/2006 | Bedekar et al. ............... 709/232 |
| 7,085,234 | B2 * | 8/2006 | Kimball et al. ............... 370/235 |
| 7,237,034 | B2 | 6/2007 | Clarke et al. |

(Continued)

FOREIGN PATENT DOCUMENTS

| EP | 2107733 A1 | 10/2009 |
| WO | 2012174305 | 12/2012 |
| WO | 2012174443 | 12/2012 |
| WO | 2012174447 | 12/2012 |

OTHER PUBLICATIONS

Co-pending U.S. Appl. No. 13/339,869, filed Dec. 29, 2011.
Co-pending U.S. Appl. No. 61/497,900, filed Jun. 16, 2011.

(Continued)

*Primary Examiner* — Tri H Phan
(74) *Attorney, Agent, or Firm* — DeLizio Gilliam, PLLC

(57) ABSTRACT

A hybrid network device can implement functionality for automatic path selection and modification in a hybrid communication network. The hybrid network device can select an initial network interface from a plurality of network interfaces for transmitting a packet stream. In response to determining that the medium utilization of the initial network interface exceeds the medium utilization threshold, the hybrid network device can identify one or more packet streams originating from the initial network interface to shift to corresponding one or more alternate network interfaces. The hybrid network device can attempt to reduce the medium utilization of the initial network interface below the medium utilization threshold while maintaining the medium utilization of the one or more alternate network interfaces below the corresponding medium utilization thresholds. The hybrid network device can shift the one or more packet streams from the initial network interface to the corresponding one or more alternate network interfaces.

39 Claims, 13 Drawing Sheets

(56) References Cited

U.S. PATENT DOCUMENTS

| | | | |
|---|---|---|---|
| 7,239,608 B2* | 7/2007 | Sreejith et al. | 370/230 |
| 7,430,167 B2* | 9/2008 | Glaise et al. | 370/229 |
| 7,508,763 B2 | 3/2009 | Lee | |
| 7,742,497 B2 | 6/2010 | Ganti et al. | |
| 7,903,557 B1 | 3/2011 | Colloff et al. | |
| 8,014,278 B1* | 9/2011 | Subramanian et al. | 370/229 |
| 8,284,668 B2* | 10/2012 | Matsuo | 370/235 |
| 8,526,317 B2 | 9/2013 | Leconte et al. | |
| 2004/0029553 A1 | 2/2004 | Cain | |
| 2004/0218557 A1 | 11/2004 | Kim et al. | |
| 2005/0007955 A1 | 1/2005 | Schrodi | |
| 2005/0185587 A1 | 8/2005 | Klinker et al. | |
| 2005/0213506 A1 | 9/2005 | Wakumoto et al. | |
| 2006/0250959 A1 | 11/2006 | Porat | |
| 2007/0223391 A1* | 9/2007 | Kuroki et al. | 370/252 |
| 2008/0259888 A1 | 10/2008 | Terashima | |
| 2009/0238074 A1 | 9/2009 | Vasseur et al. | |
| 2009/0303882 A1 | 12/2009 | Tanaka et al. | |
| 2010/0309912 A1 | 12/2010 | Mehta et al. | |
| 2011/0110248 A1 | 5/2011 | Koitabashi et al. | |
| 2012/0320924 A1 | 12/2012 | Baliga et al. | |
| 2013/0039173 A1 | 2/2013 | Ehsan et al. | |
| 2013/0148655 A1 | 6/2013 | Malik et al. | |

OTHER PUBLICATIONS

Co-pending U.S. Appl. No. 61/498,206, filed Jun. 17, 2011.
Co-pending U.S. Appl. No. 61/498,250, filed Jun. 17, 2011.
Co-pending U.S. Appl. No. 13/495,892, filed Jun. 13, 2012.
Docwiki, "Border Gateway Protocol", Cisco, IOS Technology Handbook, Dec. 17, 2009, pp. 1-7, http://docwiki.cisco.com/wiki/Border_Gateway_Protocol.
International Search Report and Written Opinion—PCT/US2012/042767—ISA/EPO—Sep. 24, 2012.
"International Application No. PCT/US/2012/042767 Written Opinion of the IPEA", Jun. 10, 2013, 6 pages.
"PCT Application No. PCT/US12/42546 International Search Report", Oct. 8, 2012, 11 pages.
"PCT Application No. PCT/US12/42772 International Search Report", Sep. 24, 2012, 10 pages.
"PCT Application No. PCT/US2012/042546 International Preliminary Report on Patentability", Oct. 15, 2013, 6 pages.
"International Application No. PCT/US/2012/042767 International Preliminary Report on Patentability", Nov. 6, 2013, 10 pages.

* cited by examiner

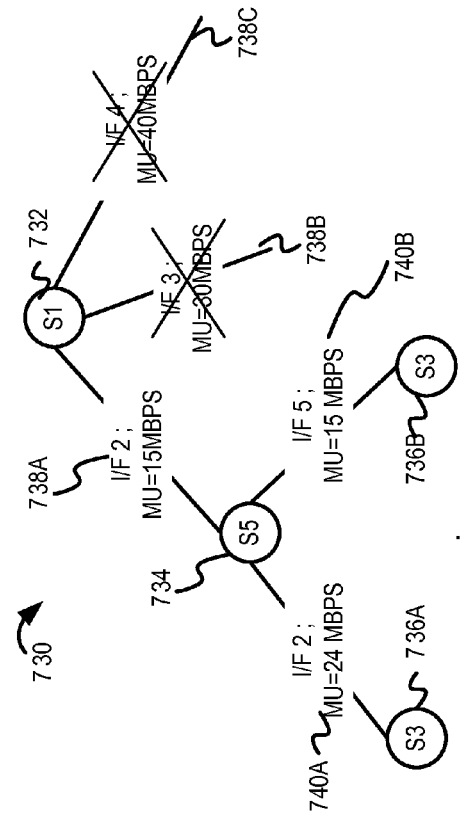
FIG. 7A
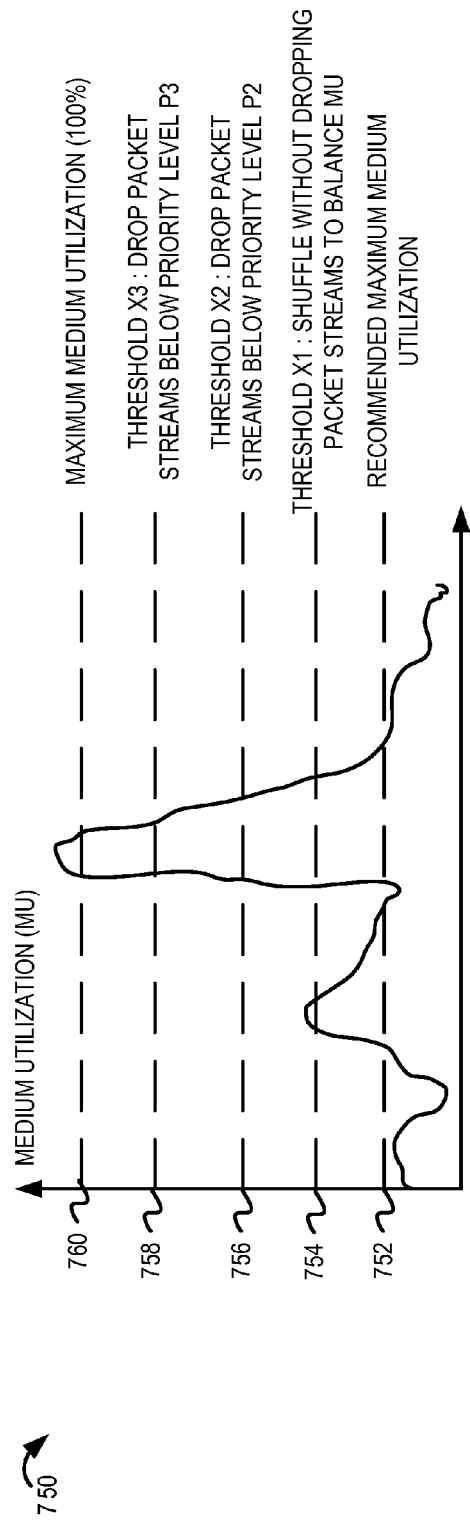
FIG. 7B
FIG. 7C

AUTOMATIC PATH SELECTION FOR HYBRID COMMUNICATION NETWORKS

RELATED APPLICATION

This application claims the priority benefit of U.S. Provisional Application Ser. No. 61/498,206 filed on Jun. 17, 2011 and U.S. Provisional Application Ser. No. 61/498,250 filed on Jun. 17, 2011.

BACKGROUND

Embodiments of the inventive subject matter generally relate to the field of communication systems and, more particularly, to automatic path selection for hybrid communication networks.

Hybrid communication networks typically comprise multiple networking technologies (e.g., wireless local area network (WLAN) technologies, powerline communication technologies, Ethernet, etc.). The multiple networking technologies are typically interconnected using bridging-capable devices that forward packets between the different network technologies and media to form a single, extended communication network. Typically, the communication mechanisms, and protocol specifics (e.g., device and topology discovery, bridging to other networks, etc.) are unique to each networking technology.

SUMMARY

Various embodiments for automatic path selection in hybrid communication networks are disclosed. In one embodiment, an initial network interface is selected from a plurality of network interfaces of a source communication device for transmitting a plurality of packets associated with a packet stream from the source communication device to a destination communication device. It is determined whether a medium utilization associated with the initial network interface of the source communication device exceeds a medium utilization threshold. If the medium utilization associated with the initial network interface of the source communication device exceeds the medium utilization threshold, one or more packet streams originating from the initial network interface of the source communication device are identified to migrate to corresponding one or more alternate network interfaces from the plurality of network interfaces of the source communication device to reduce the medium utilization associated with the initial network interface below the medium utilization threshold. The one or more packet streams are migrated from the initial network interface to the corresponding one or more alternate network interfaces of the source communication device.

BRIEF DESCRIPTION OF THE DRAWINGS

The present embodiments may be better understood, and numerous objects, features, and advantages made apparent to those skilled in the art by referencing the accompanying drawings.

FIG. 7A is an example sorted packet stream table for ordering packet streams associated with a network interface;

FIG. 7B depicts an example medium utilization analysis graph that corresponds to the sorted packet stream table of FIG. 7A;

FIG. 7C illustrates a plurality of example medium utilization thresholds for determining when/whether to drop packet streams at one or more priority levels;

DESCRIPTION OF EMBODIMENT(S)

Figure 1:
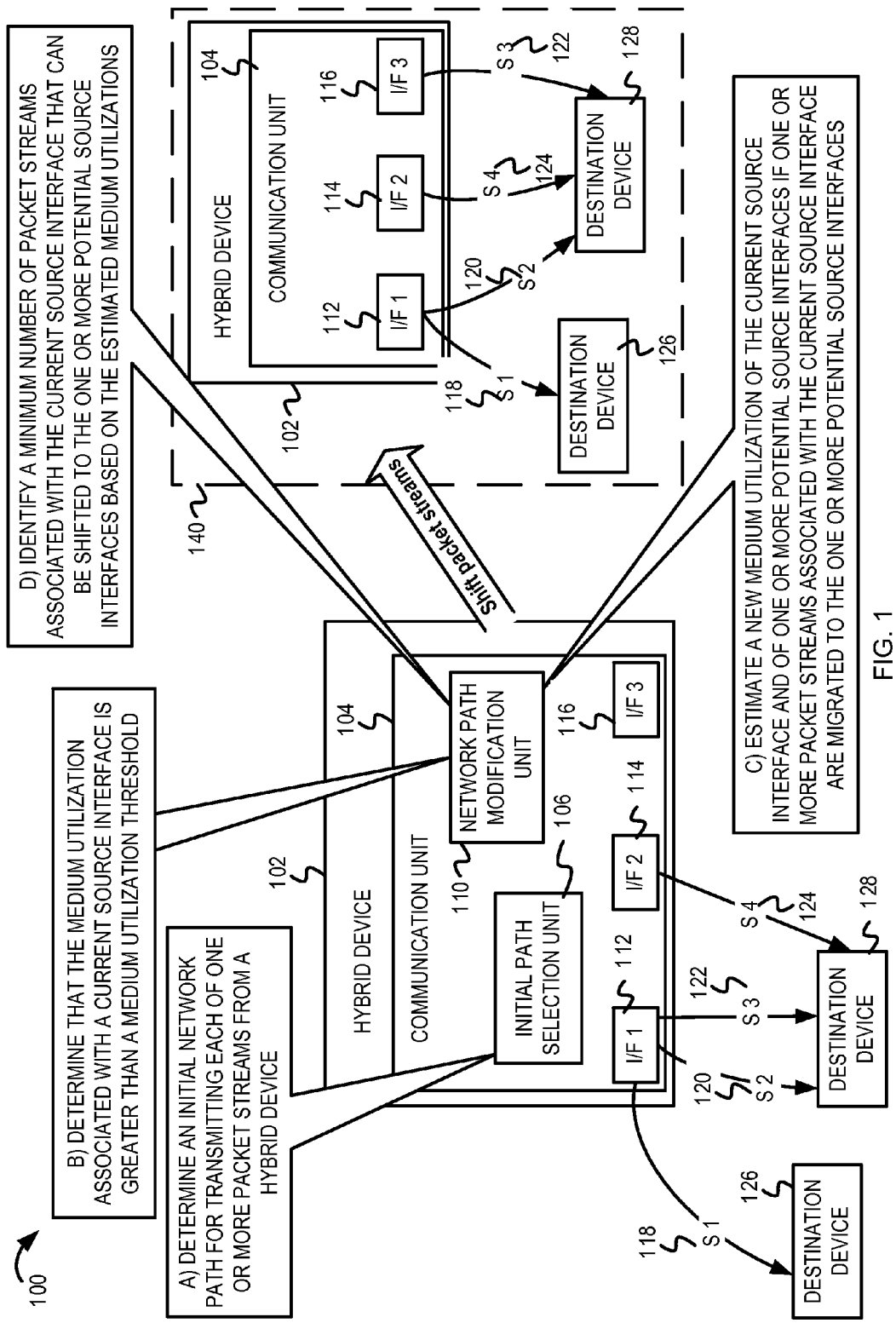
FIG. 1 is an example conceptual diagram illustrating a mechanism for automatic network path modification in a hybrid communication network.

The description that follows includes exemplary systems, methods, techniques, instruction sequences, and computer program products that embody techniques of the present inventive subject matter. However, it is understood that the described embodiments may be practiced without these specific details. For instance, although in some embodiments the packet ordering mechanism can be implemented for hybrid communication networks comprising wireless local area network (WLAN) devices (e.g., IEEE 802.11n devices), powerline network devices (e.g., HomePlug AV) and Ethernet devices, in other embodiments the packet ordering mechanism can be implemented for hybrid communication networks that may comprise other suitable types of network devices that implement other standards/protocols (e.g., Multimedia over Coax Alliance (MoCA), WiMAX, etc.). In other instances, well-known instruction instances, protocols, structures, and techniques have not been shown in detail in order not to obfuscate the description.

A hybrid communication device typically comprises multiple network interfaces (each of which couple the hybrid communication device to one or more communication networks/communication media). Typically, existing routing algorithms (e.g., Border Gateway Protocol and other such network layer routing algorithms) are used to select one of the multiple network interfaces and consequently, the network path via which a packet stream (e.g., information generated by an application) is transmitted to a destination device. The existing routing algorithms may select the network path as a shortest network path (e.g., with a minimum number of "hops" or forwarding devices) between the hybrid communication device and the destination device by calculating/estimating the round trip transit time between the hybrid communication device and the destination device. However, the network path via which the packet stream is transmitted can influence whether the throughput requirements of the packet stream can be met, whether existing packet streams being transmitted on the network path will be affected, available bandwidth and medium utilization of the communication medium that provides the network path, and other such performance factors. In some cases, arbitrarily selecting the network path or selecting the network path based on existing "least hop" routing algorithms can adversely affect the throughput, performance, and quality of packet streams with strict requirements (e.g., video streams). For example, loss of even a few packets of a video stream can cause significant pixilation and decrease in quality, thus affecting a user's viewing experience. Furthermore, as described above, the hybrid communication device supports multiple network interfaces that couple the hybrid communication device to corresponding multiple shared communication media. Therefore, the round trip transit time between the hybrid communication device and the destination device may not be a suitable metric for selecting the network path for a packet stream because of the possibility of large variations in the round trip transit time and the dynamic nature of the environment.

In some implementations (as will be described in FIGS. 1-7C), a hybrid communication device can implement an automatic network path modification system for modifying a previously selected network path associated with a packet stream to balance medium utilization across all the network interfaces of the hybrid communication device (and consequently across all the communication media to which the hybrid communication device is coupled). The automatic network path modification system can detect medium utilization associated with each network interface and can automatically attempt to balance the medium utilization across the network interfaces if the medium utilization associated with one of the network interfaces ("current source interface") exceeds a configurable medium utilization threshold or if one of the network interfaces completely fails. The automatic network path modification system can determine the minimum number of packet streams associated with the current source interface that should to be shifted to alternate network interfaces of the hybrid communication device so that the medium utilization of the current source interface falls below the medium utilization threshold. Such an automatic network path modification system can attempt to select the best network path (and consequently the best network interface and communication medium) for transmitting a packet stream. The automatic network path modification system can also balance the medium utilization across all network interfaces and corresponding communication media, and can maximize the bandwidth available on each of the available communication media. The automatic network path modification system can also immediately react to deterioration (or oversubscription) of a network interface by moving one or more packet streams associated with the network interface to appropriate alternate network interfaces, with minimal disruption of the packet streams. Furthermore, by migrating a minimum number of packet streams and/or by attempting to first migrate low priority packet streams, high priority (and high performance) packet streams can be protected from packet drops, "glitches," and other disturbances.

In some implementations, a hybrid communication network can comprise multiple hybrid communication devices that share multiple communication media (e.g., WLAN, powerline networks, Ethernet, etc.). Therefore, in response to detecting oversubscription of one of the shared communication media, some or all of the hybrid communication devices may simultaneously react to the detected medium oversubscription and may simultaneously (but independently) attempt to migrate packet streams to other network interfaces (i.e., other shared communication media) to eliminate the detected medium oversubscription. This can cause medium oversubscription on the other shared communication media. Such a scenario whereby the hybrid communication devices cause medium oversubscription of other communication media in an attempt to resolve a previously detected medium oversubscription is referred to herein as a race condition in network path selection. The race condition can cause instability, can affect transmission of packet streams from all of the hybrid communication devices, and can affect performance/throughput associated with all of the hybrid communication devices.

In some implementations (as will be described in FIGS. 8-12), the probability of race conditions in automatic network path selection can be reduced by implementing a coordinated back-off mechanism to desynchronize the hybrid communication devices in the hybrid communication network and to consequently avoid simultaneous reaction of hybrid communication devices to medium oversubscription events. Each of the hybrid communication devices can be configured to initiate a random back-off time interval in response to detecting medium oversubscription, such that no two hybrid communication devices attempt to simultaneously migrate their respective packet streams to alternate network interfaces. Coordination between the hybrid communication devices to avoid the probability of a race condition can be achieved by sharing packet stream information between the hybrid communication devices. The hybrid communication devices can use the shared packet stream information to determine the order in which each of the hybrid communication devices should attempt to balance medium utilization and eliminate medium oversubscription. Based on this order determined from the shared packet stream information, the hybrid communication devices can calculate and initiate their respective back-off time intervals. The hybrid communication devices can identify and migrate one or more packet streams to alternate network interfaces (as will be described below in FIGS. 1-7C) only if the communication medium is still oversubscribed after their respective back-off time interval elapses. Such a distributed coordinated back-off mechanism can help avoid race conditions in automatic path selection, improve performance and throughput of the hybrid communication devices, and can minimize the possibility of medium oversubscription.

FIG. 1 is an example conceptual diagram illustrating a mechanism for automatic network path modification in a hybrid communication network 100. The hybrid communication network 100 comprises a hybrid device 102 and two destination devices 126 and 128. The hybrid device 102 comprises a communication unit 104. The communication unit 104 comprises an initial path selection unit 106 and a network path modification unit 110. In some implementations, the hybrid device 102 can comprise multiple network interfaces each of which connect the hybrid device 102 to different communication networks. With reference to FIG. 1, the hybrid device 102 comprises three network interfaces 112, 114, and 116 that are represented in FIG. 1 as I/F 1, I/F 2, and I/F 3, respectively. In one example, the hybrid device 102 can comprise a powerline interface, an Ethernet interface, and a WLAN interface that enable the hybrid devices to connect to a powerline communication network, Ethernet, and a WLAN, respectively. In some implementations, the hybrid device 102 can be an electronic device such as a laptop computer, a tablet computer, a mobile phone, a smart appliance, a gaming console, an access point, or other suitable electronic devices with suitable communication capabilities (e.g., WLAN communication capabilities, powerline communication capabilities, Ethernet communication capabilities, etc.). In some embodiments, in addition to powerline communication protocols, WLAN communication protocols, and Ethernet communication protocols, the communication unit 104 can implement other protocols and functionality to enable other types of communications (e.g., Bluetooth®, WiMAX, etc.).

In some implementations, the networking functionality of the hybrid device 102 can be partitioned into sub-functions using a "layered" approach, consistent with the International Standards Organization (ISO) Open Systems Interconnection (OSI) reference model. The set of networking protocol layers may be referred to as a "protocol stack." The protocol stack is typically divided into "upper protocol layers" and "lower protocol layers." The lower protocol layers include the physical (PHY) layer and the Medium Access Control (MAC) layer. Typically, the number of PHY layers and corresponding MAC layers is determined based on the number of network interfaces associated with the hybrid device 102. In other words, if the hybrid device 102 comprises three network interfaces 112, 114, and 116, the protocol stack of the hybrid device 102 typically comprises three PHY layers and corresponding three MAC layers. Each of the PHY layers and the corresponding MAC layer couples the hybrid device 102 to one (possibly distinct) communication network. The upper protocol layers can include a network layer (e.g., implementing an Internet Protocol version 4 (IPv4) communication protocol, an Internet Protocol version 6 (IPv6) communication protocol, an AppleTalk® communication protocol, or other suitable network layer protocol), a transport layer (e.g., transmission control protocol (TCP), user datagram protocol (UDP), or other suitable transport layer protocol depending on the network layer protocol), and one or more applications.

The protocol stack of the hybrid device 102 can also comprise a "hybrid adaptation layer" between the network layer and the MAC layers. In some implementations, the hybrid adaptation layer can comprise the initial path selection unit 106 and/or the network path modification unit 110 to execute functionality described below in FIGS. 1-12. The hybrid adaptation layer can implement functionality for managing communications in the hybrid device 102 with a single set of upper protocol layers (e.g., a single network layer and a single transport layer) but with multiple network interfaces (e.g., multiple PHY layers and multiple MAC layers). The hybrid adaptation layer can also enable the upper protocol layers to operate as if the hybrid device 102 comprises only a single MAC layer and a corresponding single PHY layer. It is noted that the protocol stack can comprise other suitable layers or sub-layers, depending on the networking technology and optional protocols that might be implemented. Furthermore, in some embodiments, one or more other sub-layers (singly or in combination with the hybrid adaptation layer) may execute functionality described herein in FIGS. 1-12. With reference to FIG. 1, the communication unit 104 of the hybrid device 102 can implement operations for determining an initial network path for transmitting a packet stream to a destination hybrid device (described in stages A-B) and for dynamically assessing and modifying the network path based on variations in the characteristics of the network path, traffic estimates, and network topology (as will be described in stages C-D).

At stage A, the initial path selection unit 106 determines an initial network path for transmitting each of one or more packet streams from the hybrid device 102. A packet stream (also referred to as a packet flow) can comprise a sequence of packets (e.g., Internet Protocol (IP) packets) generated by an application/process on the hybrid device 102 ("source device") for transmission to a destination device. The initial path selection unit 106 can determine the initial network path via which to transmit a packet stream to the destination device based on the available network interfaces. In other words, the initial path selection unit 106 can select one of the network interfaces 112, 114, and 116 of the hybrid device 102 for transmitting the packet stream to the destination device. In some implementations, the initial path selection unit 106 can determine the initial network path (i.e., the initial network interface) based on priority associated with each of the network interfaces 112, 114, and 116 and based on the packet stream to be transmitted. In another implementation, the initial path selection unit 106 can determine the initial network path based, at least in part, on available link capacity and the medium utilization associated with the communication media to which the network interfaces 112, 114, and 116 couple the hybrid device 102. Operations for selecting the initial network path for each of the packet streams to be transmitted from the hybrid device 102 will further be described in FIG. 2. As depicted in FIG. 1, the hybrid device 102 transmits four packet streams 118, 120, 122, and 124 that are represented as S1, S2, S3, and S4 in FIG. 1. As depicted in FIG. 1, in one example, the initial path selection unit 106 determines that the hybrid device 102 should transmit the packet stream 118 to the destination device 126 via the network interface 112. The initial path selection unit 106 determines that the hybrid device 102 should transmit the packet streams 120 and 122 to the destination device 128 via the network interface 112. The initial path selection unit 106 determines that the hybrid device 102 should transmit the packet stream 124 to the destination device 128 via the network interface 114.

At stage B, the network path modification unit 110 determines that the medium utilization associated with one of the network interfaces is greater than a medium utilization threshold. The network interface of the hybrid network device 102 that is deemed to be associated with a medium utilization that is greater than the medium utilization threshold can be selected for subsequent analysis and is herein referred to as a "current source interface." At stage B, the network path modification unit 110 (or a suitable communication medium analysis unit) can determine that the medium utilization associated with the communication medium to which the current source interface couples the hybrid network device 102 exceeds the medium utilization threshold associated with the communication medium. In other words, the network path modification unit 110 can determine that the cumulative bandwidth consumed by the packet streams originating from one of the network interfaces exceeds the total bandwidth allocated for communication via that network interface. For example, if the current source interface 112 is an Ethernet interface, the network path modification unit 110 can determine that the medium utilization associated with the Ethernet is greater than an Ethernet utilization threshold. In response to determining that the medium utilization associated with the current source interface 112 is greater than the medium utilization threshold, the network path modification unit 110 can determine an identifier of the current source interface 112, and the difference between the medium utilization associated with the current source interface 112 and the medium utilization threshold. The difference between the medium utilization associated with the current source interface 112 and the medium utilization threshold may be referred to as "medium utilization overshoot." In some implementations, if multiple network interfaces are associated with a medium utilization that is greater than the corresponding medium utilization threshold, the network path modification unit 110 can determine to analyze (i.e., select as the current source interface) the network interface associated with the largest medium utilization overshoot. In other implementations, if multiple network interfaces are associated with a medium utilization that is greater than the corresponding medium utilization threshold, the network path modification unit 110 can determine to analyze (i.e., select as the current source interface) the network interface associated with the highest priority.

At stage C, the network path modification unit 110 estimates a new medium utilization of the current source interface and one or more potential source interfaces if one or more of the packet streams associated with the current source interface are migrated to the one or more potential source interfaces. As will be described below in FIGS. 3-7C, in response to determining that the medium utilization associated with the current source interface 112 is greater than the medium utilization threshold (at stage B), the network path modification unit 110 can attempt to migrate one or more packet streams from the current source interface 112 to one or more other network interfaces ("potential source interfaces") of the hybrid device 102. The potential network interfaces can be selected based, at least in part, on the amount of bandwidth that may be required to transmit the packet stream (also referred to as the medium utilization of the packet stream or the "stream medium utilization") and on the available capacity (or bandwidth) associated with each of the network interfaces. In some implementations, the stream medium utilization can be calculated as the percentage of time that the packets associated with the packet stream occupy the communication medium associated with a network interface. As will be further described in FIGS. 3-7C, beginning with the packet stream that has the highest stream medium utilization, the network path modification unit 110 can successively simulate migration (or shifting) of the packet streams from the current source interface 112 to each of the potential source interfaces 114 and 116. The network path modification unit 110 can estimate the new medium utilization of the potential source interfaces and of the current source interface 112 as a result of the simulated packet stream migration.

At stage D, the network path modification unit 110 identifies a minimum number of packet streams associated with the current source interface 112 that can be shifted to one or more potential source interfaces based, at least in part, on the medium utilization estimated at stage C. As will be described below in FIGS. 3-4, the network path modification unit 110 can analyze the estimated new medium utilization of the current source interface and the estimated new medium utilization of the potential source interfaces determined at stage C. With reference to FIG. 1, the network path modification unit 110 determines that the medium utilization associated with the current source interface 112 can be decreased below the medium utilization threshold if the packet stream 122 is migrated from the current source interface 112 to the potential source interface 116. In other words, the network path modification unit 110 can determine that the medium utilization associated with the current source interface 112 can be decreased below the medium utilization threshold if the packet stream 122 is transmitted via the network interface 116 instead of via the current source interface 112. Accordingly, as depicted by the subsequent state of the communication network (represented by the dashed block 140), the communication unit 104 modifies the initial network path of the packet stream 122 so that the packet stream 122 is transmitted to the destination device 128 via the network interface 116 (instead of the network interface 112). It is noted that the potential source interface that is deemed to be associated with the lowest estimated medium utilization (or another suitable path metric) can be selected as the "alternate network interface" for the packet stream. The path modification unit 110 can then migrate the packet stream by transmitting the packet stream via the alternate network interface instead of via the current source interface.

Figure 2:
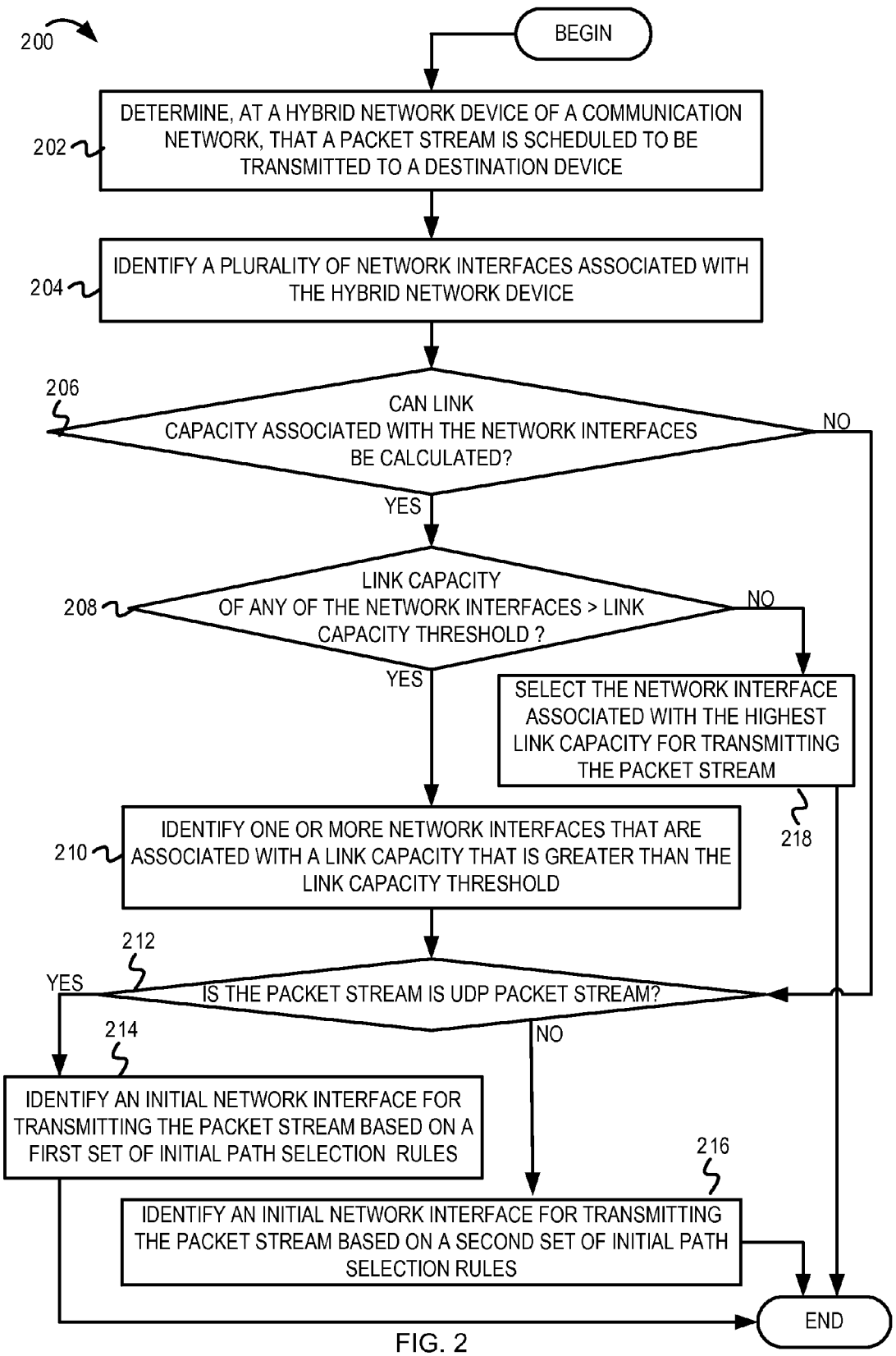
FIG. 2 is a flow diagram illustrating example operations for identifying an initial network path for transmitting a packet stream.

FIG. 2 is a flow diagram ("flow") 200 illustrating example operations for identifying an initial network path for transmitting a packet stream. The flow 200 begins at block 202.

At block 202, a hybrid network device of a communication network determines that a packet stream is scheduled to be transmitted to a destination device. With reference to the example of FIG. 1, the initial path selection unit 106 of the hybrid device 102 can determine that the packet stream 118 is scheduled to be transmitted to the destination device 126. As described above, a packet stream can comprise a sequence of packets generated by an application/process for transmission to a destination device. In some implementations, as will be further described below, the packet stream may be classified based on the transport layer associated with the application that generated the packet stream (e.g., transport control protocol (TCP) packet stream, user datagram protocol (UDP) packet stream, etc.). The flow continues at block 204.

At block 204, a plurality of network interfaces associated with the hybrid network device are identified. For example, the initial path selection unit 106 can determine that the hybrid device 102 comprises three network interfaces 112, 114, and 116. The initial path selection unit 106 can also identify the type of the network interface and the corresponding communication medium to which the network interface couples the hybrid network device 102. For example, the initial path selection unit 106 may determine that the network interface 112 is a WLAN interface that couples that hybrid device 102 to a WLAN. As another example, the initial path selection unit 106 may determine that the network interface 114 is a PLC interface that couples that hybrid device 102 to the powerline network. As another example, the initial path selection unit 106 may determine that the network interface 116 is an Ethernet interface that couples that hybrid device 102 to the Ethernet. The flow continues at block 206.

At block 206, it is determined whether the link capacity associated with the plurality of network interfaces can be calculated. For example, the initial path selection unit 106 can determine whether the link capacity associated with each of the communication media that correspond to the network interfaces 112, 114, and 116 can be calculated. The initial path selection unit 106 can determine the link capacity (e.g., in Mbps) of a communication medium based, at least in part, on the maximum permissible medium utilization (MU) associated with the communication medium. In some implementations, maximum permissible medium utilization (MU) associated with the communication medium can be a configurable parameter. In one example, the link capacity of the communication medium can be directly proportional to (1-MU). It is noted that the medium utilization of a communication medium can be indicative of the percentage of time that the communication medium is busy (e.g., the percentage of time for which packets are being exchanged via the communication medium). If it is determined that link capacity associated with the plurality of network interfaces can be calculated (or are known), the flow continues at block 208. Otherwise, the flow continues at block 212.

At block 208, it is determined whether the link capacity associated with any of the network interfaces is greater than a link capacity threshold. For example, the initial path selection unit 106 can determine whether the link capacity associated with any of the communication media (that correspond to the plurality of network interfaces) is greater than the link capacity threshold. In some implementations, the link capacity threshold may be a randomly selected value. In another implementation, the link capacity threshold may be selected based on historical analysis of transmitted packet streams, based on knowledge of the communication media, and/or based on the knowledge of the destination device. In some implementations, the link capacity threshold may be a predetermined static value. In other implementations, the link capacity threshold may be a dynamic value and may be varied based, at least in part, on an estimated stream medium utilization associated with the packet stream to be transmitted. If it is determined that the link capacity associated with at least one of the network interfaces is greater than the link capacity threshold, the flow continues at block 210. Otherwise, the flow continues at block 218.

At block 210, one or more network interfaces that are associated with a link capacity that is greater than the link capacity threshold are identified. For example, the initial path selection unit 106 can identify one or more network interfaces that correspond to the communication media associated with a link capacity that is greater than the link capacity threshold. At block 210, the initial path selection unit 106 can attempt to identify one or more communication media that comprise sufficient available link capacity (i.e., sufficient bandwidth) to support transmission of the packet stream (generated at block 202). For example, for the hybrid device 102 that can be coupled to three communication media—a powerline network, the Ethernet, and the WLAN (via a PLC interface, an Ethernet interface, and a WLAN interface respectively), it may be determined that the PLC medium is associated with a link capacity of 40 Mbps, that the Ethernet is associated with a link capacity of 20 Mbps, and that the WLAN is associated with a link capacity of 50 Mbps. If the link capacity threshold is selected as 25 Mbps, the PLC interface and the WLAN interface can be selected at block 210. In this example, either the PLC interface or the WLAN interface can be selected as the initial network interface for transmitting the packet stream, as will be further described below. The flow continues at block 212.

At block 212, it is determined whether the packet stream is a UDP packet stream. For example, the initial path selection unit 106 can determine whether the packet stream 118 to be transmitted is a UDP packet stream. In some implementations, the initial network interface (and consequently the initial network path) via which the packet stream should be transmitted can be selected based on whether the transport layer protocol implemented by the application that generated the packet stream 118 is UDP or another non-UDP protocol (e.g., TCP). It is noted, however, that in other implementations, the classification of packet streams may not be limited to UDP or non-UDP packet streams. Instead, the classification of packets streams and consequently the set of initial path selection rules can be extended to support any number of packet stream types. If it is determined that the packet stream 122 is a UDP packet stream, the flow continues at block 214. Otherwise, the flow continues at block 216.

At block 214, an initial network interface for transmitting the packet stream is identified based on a first set of initial path selection rules in response to determining that the packet stream is a UDP packet stream. For example, the initial path selection unit 106 can select the initial network interface for transmitting the packet stream based on the first set of initial path selection rules. For example, if the source hybrid device 102 comprise four network interfaces—an Ethernet interface, a PLC interface, a 5 GHz WLAN interface, and a 2.4 GHz WLAN interface, the first set of initial path selection rules can indicate that the initial network interface for a UDP packet stream 118 should be selected in accordance with the following priority—Ethernet>PLC>5 GHz WLAN>2.4 GHz WLAN. In other words, the initial path selection rules for a UDP packet stream can indicate that the Ethernet interface should be selected for transmitting the UDP packet stream 118 if the Ethernet interface is available. Otherwise, the PLC interface should be selected for transmitting the UDP packet stream 118 if the PLC interface is available. If neither the Ethernet interface nor the PLC interface is available, the 5 GHz WLAN interface should be selected for transmitting the UDP packet stream 118. If none of the aforementioned interfaces are available, the 2.4 GHz WLAN interface should be selected for transmitting the UDP packet stream 118. If all of the network interfaces are available (e.g., if the hybrid device 102 and the destination device 126 support data communication via the Ethernet, the powerline network, the 5 GHz WLAN, and the 2.4 GHz WLAN), the initial path selection unit 106 can determine that the UDP packet stream 118 should be transmitted to the destination device 126 via the network interface associated with the highest priority (the Ethernet interface, in the above example).

In some implementations, only a subset of the network interfaces may be available—for example, only a subset of the network interfaces may be associated with a link capacity that is greater than the link capacity threshold. With reference to the example of block 210, where the PLC interface and the 2.4 GHz WLAN interface were associated with a link capacity that was greater than the link capacity threshold, the initial path selection unit 106 can determine that the UDP packet stream 118 should be transmitted to the destination device 126 via the available network interface associated with the highest priority (the PLC interface, in this example). It is noted that the interface prioritization for selecting the initial network path for a UDP packet stream (as described above) is an example. The interface prioritization for selecting the initial network path for a UDP packet stream is configurable and other suitable priority scheme(s) can be implemented for selecting the initial network interface for transmitting a UDP packet stream. From block 214, the flow ends.

At block 216, the initial network interface for transmitting the packet stream is identified based on a second set of initial path selection rules in response to determining that the packet stream is not a UDP packet stream. For example, the initial path selection unit 106 can select the initial network interface for transmitting the packet stream based on the second set of initial path selection rules. In one implementation, the second set of initial path selection rules can indicate that the initial network interface for a non-UDP packet stream 120 should be selected in accordance with the following priority—2.4 GHz WLAN>5 GHz WLAN>PLC>Ethernet. In other words, the 2.4 GHz WLAN interface should be selected for transmitting the non-UDP packet stream 120 if it is available. Otherwise, if the 5 GHz WLAN interface is available, the 5 GHz WLAN interface should be selected for transmitting the non-UDP packet stream 120. If neither the 2.4 GHz WLAN interface nor the 5 GHz WLAN interface are available, the PLC interface should be selected for transmitting the non-UDP packet stream 120. If none of the aforementioned interfaces are available, the Ethernet interface should be selected for transmitting the non-UDP packet stream 120. As described above with reference to block 214, in some implementations, all of the network interfaces may available for transmitting the non-UDP packet stream 120, while in other implementations only a subset of the network interfaces may be available for transmitting the non-UDP packet stream 120. In each of these implementations, the initial network interface (and consequently the initial network path) for transmitting the non-UDP packet stream 120 can be selected from the available network interfaces in accordance with the second set of initial path selection rules. It is noted that the interface prioritization described above for selecting the initial network path for a non-UDP packet stream is an example. The network interface prioritization for selecting the initial network path for a non-UDP packet stream is configurable and other suitable priority schemes can be implemented for selecting the initial network interface for transmitting the non-UDP packet stream. From block 216, the flow ends.

At block 218, a network interface that is associated with the highest link capacity is selected as the initial network interface for transmitting the packet stream. The flow 200 moves from block 206 to block 218 if the initial path selection unit 106 determines that the link capacity associated with all of the network interfaces is less than the link capacity threshold. In this scenario, the initial path selection unit 106 can select the network interface (and consequently the communication medium) that is associated with the highest link capacity, irrespective of whether the packet stream is a UDP packet stream or a non-UDP packet stream. For example, it may be determined that the powerline medium is associated with a link capacity of 20 Mbps, that the Ethernet is associated with a link capacity of 10 Mbps, and that the WLAN is associated with a link capacity of 15 Mbps. If the link capacity threshold is 25 Mbps, none of the communication media meet the link capacity threshold. However, because the powerline medium is associated with the highest link capacity of 20 Mbps, the initial path selection unit 106 can determine that the packet should stream should be transmitted via the powerline medium and can select the PLC interface as the initial network interface for transmitting the packet stream. From block 218, the flow ends.

It is noted that the network interface prioritization that governs selecting the initial network interfaces for transmitting the UDP packet streams and non-UDP packet streams (i.e., the first and the second sets of initial path selection rules) can be re-programmed or varied periodically. The network interface prioritization can be varied in response to detecting changes in medium utilization, detecting a new communication medium and/or a new network interface, detecting variations in communication network topology, and other such factors. After the initial network path is selected, the medium utilization associated with one or more of the network interfaces associated with the hybrid device 102 can change. In some implementations, the medium utilization associated with a network interface can exceed programmable thresholds and can approach 100% medium utilization (thus affecting the performance and throughput of the corresponding communication medium). The hybrid device 102 can attempt to modify the network path of one or more packet streams and to balance the medium utilization across the network interfaces and communication media, as will be described below with reference to FIGS. 3-7C.

Figure 3:
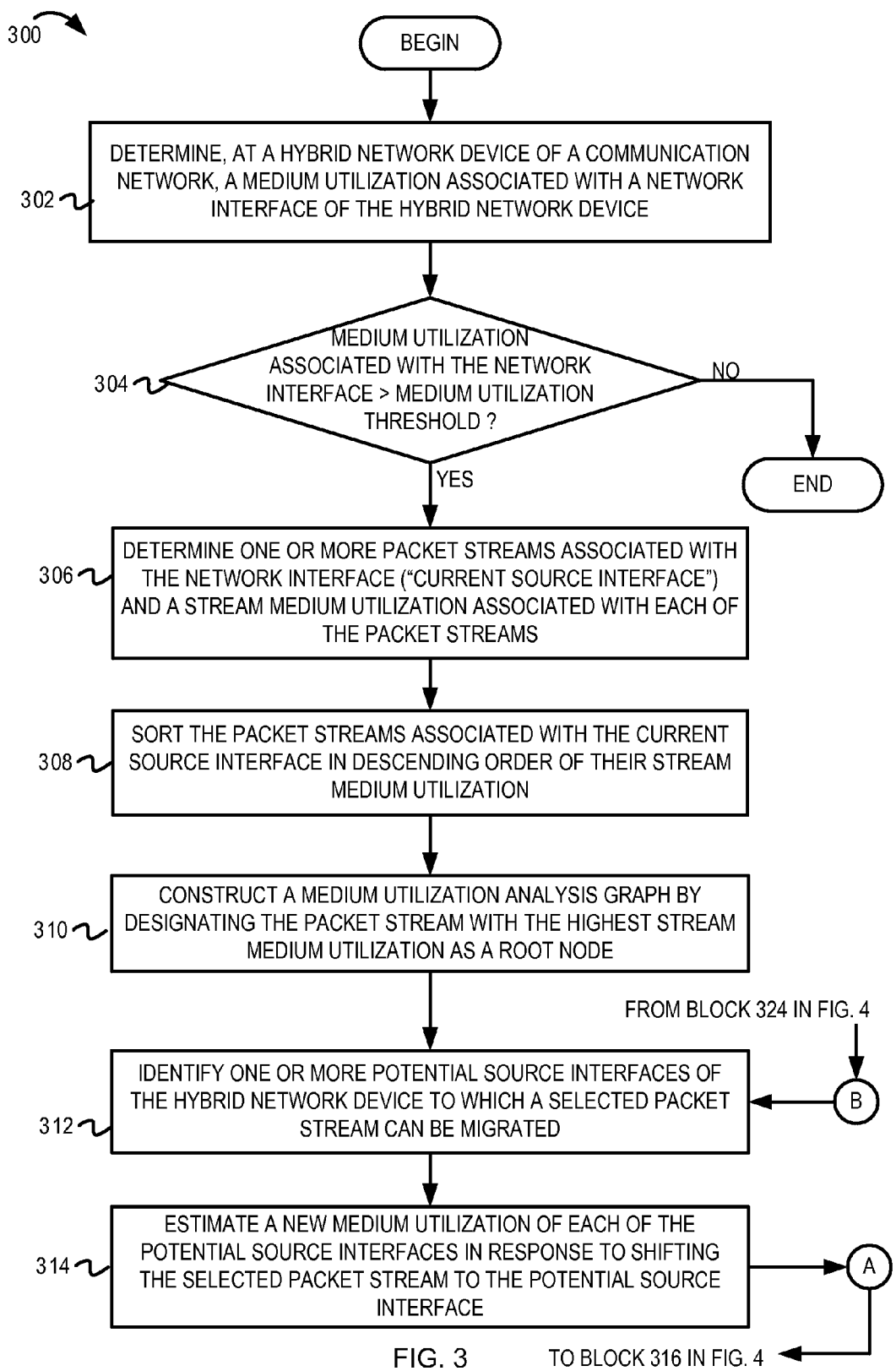
FIG. 3 is a flow diagram illustrating example operations for network path modification based on medium utilization.
Figure 4:
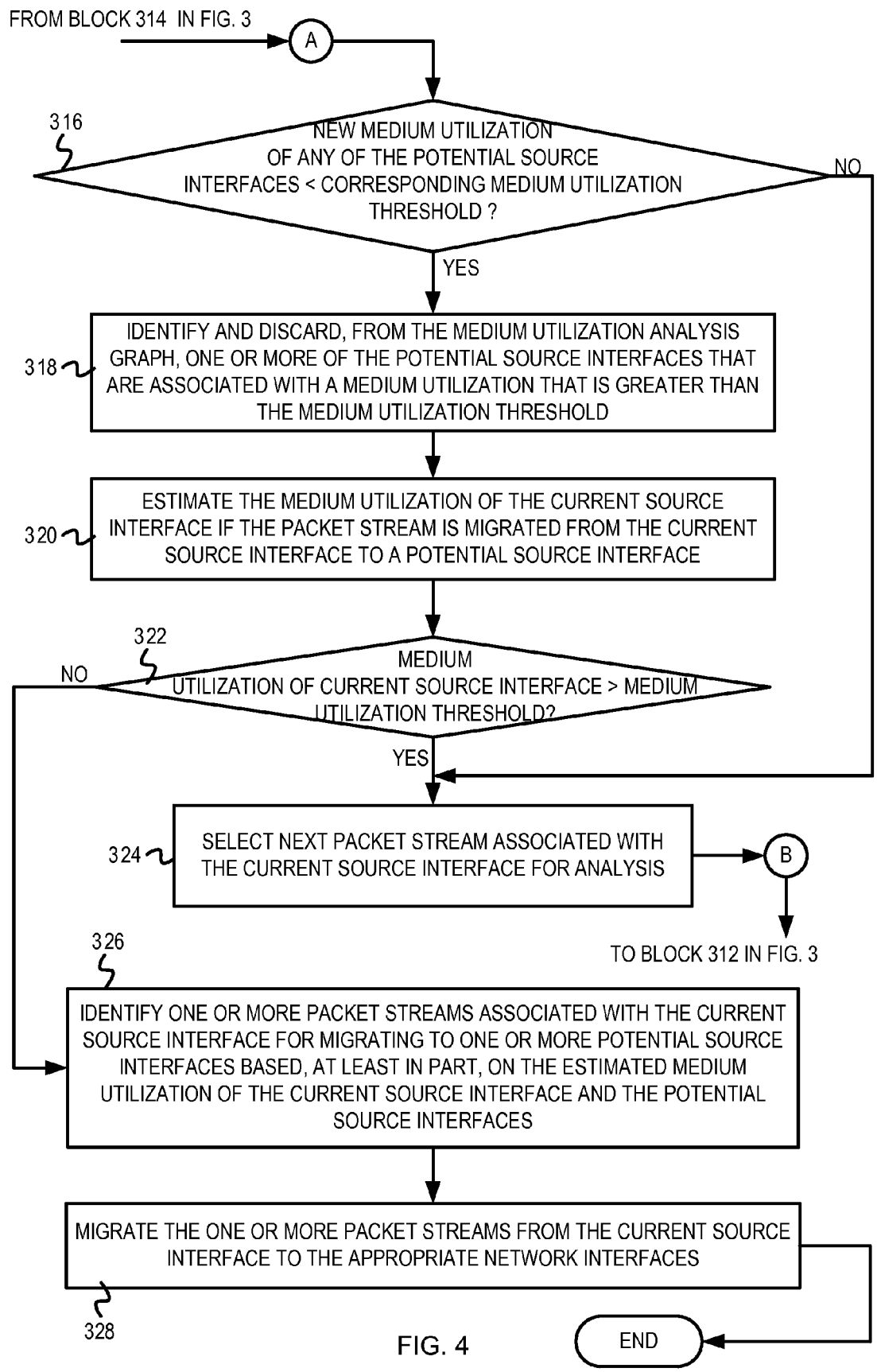
FIG. 4 is a continuation of FIG. 3 and also illustrates example operations for network path modification based on medium utilization.

FIG. 3 and FIG. 4 depict a flow diagram 300 illustrating example operations for network path modification based on medium utilization. The flow 300 begins at block 302 in FIG. 3.

At block 302, a hybrid network device of a communication network determines a medium utilization associated with a network interface of the hybrid network device. With reference to the example of FIG. 1, the network path modification unit 110 of the hybrid device 102 can determine the medium utilization associated with the network interface 112. In determining the medium utilization associated with the network interface 112, the network path modification unit 110 can determine the percentage of time that the communication medium is in use (e.g., for transmitting packet streams from the hybrid device 102). The network path modification unit 110 can also determine medium utilization associated with each of the packet streams ("stream medium utilization") being transmitted via the network interface 112. The network path modification unit 110 can also determine the total available bandwidth associated with the network interface 112 and the total medium utilization (or cumulative bandwidth) of the packet streams 118, 120, and 122 transmitted via the network interface 112. It is noted that the network path modification unit 110 can use any suitable techniques to determine the medium utilization of the network interface 112. The flow continues at block 304.

At block 304, it is determined whether the medium utilization associated with the network interface is greater than a medium utilization threshold. For example, the network path modification unit 110 can determine whether the medium utilization associated with the network interface 112 is greater than the medium utilization threshold. In some implementations, the medium utilization threshold may be a configurable parameter. The medium utilization threshold may be selected (and varied) based on the communication network topology, the communication devices in the communication network 100, throughput and other performance measurements, and/or other such factors. If it is determined that the medium utilization associated with the network interface 112 is greater than the medium utilization threshold, the flow continues at block 306. Otherwise, the flow ends. It is noted that although FIG. 3 depicts the flow coming to an end if it is determined that the medium utilization associated with the network interface is less than the medium utilization threshold, embodiments are not so limited. The network path modification unit 110 can continuously (or periodically) monitor the medium utilization associated with each of the network interfaces 112, 114, and 116 of the hybrid network device 102 and can execute operations described below if the medium utilization exceeds the medium utilization threshold.

At block 306, one or more packet streams associated with the network interface and a stream medium utilization associated with each of the packet streams are determined. The flow 300 moves from block 304 to block 306 if the network path modification unit 110 determines that the medium utilization associated with the network interface 112 is greater than the medium utilization threshold. As described above, in response to determining that medium utilization associated with the network interface 112 is greater than the medium utilization threshold, the network path modification unit 110 can determine to analyze one or more packet streams originating from the network interface 112 and can designate the network interface 112 as the "current source interface." With reference to the example of FIG. 1, the network path modification unit 110 can determine that the packet streams 118, 120, and 122 are associated with the current source interface 112. The network path modification unit 110 can also determine the stream medium utilization associated with the packet streams 118, 120, and 122. As described above in FIG. 1, the stream medium utilization can be calculated as the percentage of time that the packets associated with each of the packet streams 118, 120, and 122 occupy the communication medium that corresponds to the current source interface 112 The stream medium utilization may be indicative of how much communication medium bandwidth is (or will be) consumed in transmitting each of the packet streams 118, 120, and 122 via the communication medium. The stream medium utilization may also be indicative of how much time is (or will be) consumed in transmitting each of the packet streams 118, 120, and 122 via the communication medium. In some implementations, the stream medium utilization can be determined based, at least in part, on an initial throughput of the communication medium, a destination network interface at which the destination device will receive the packet stream, and the communication link between the hybrid device 102 and the destination device. The flow continues at block 308.

At block 308, the packet streams associated with the current source interface are sorted in descending order of their stream medium utilization. For example, the network path modification unit 110 can sort the packet streams 118, 120, and 122 associated with the current source interface 112 in descending order of their stream medium utilization. FIG. 7A depicts a sorted packet stream table 700 for packet streams associated with a current source interface I/F 1. The sorted packet stream table 700 depicts packet stream identifiers 702 for packet streams originating from the current source interface I/F 1 and stream medium utilizations 704 associated with each of the packet streams. As depicted in FIG. 7A, packet stream S1 is associated with a stream medium utilization of 10 Mbps, packet stream S5 is associated with a stream medium utilization of 9 Mbps, and packet stream S3 is associated with a stream medium utilization of 5 Mbps. The network path modification unit 110 sorts the packets streams S1, S5, S3, etc. in decreasing order of their stream medium utilization so that the packet stream S1 (with a stream medium utilization of 10 Mbps) is the first entry, the packet stream S5 (with a stream medium utilization of 9 Mbps) is the second entry, and the packet stream S3 (with a stream medium utilization of 5 Mbps) is the third entry.

In some implementations, the network path modification unit 110 may identify and sort the packet streams that can be migrated to other network interfaces of the hybrid device 102. For example, if the network path modification unit 110 determines that the packet stream S5 can only be transmitted via the network interface I/F 1 (e.g., a WLAN interface) and the corresponding communication medium, the network path modification unit 110 may not determine the stream medium utilization associated with the packet stream S5 and may not list the packet stream S5 in the sorted packet stream table 700. Sorting the packet streams associated with the current source interface 112 based on their stream medium utilization can ensure that the network path modification unit 110 analyses and migrates (if possible) the packet streams that have the largest impact on the medium utilization associated with the current source interface. Referring back to FIG. 3, the flow continues at block 310.

At block 310, a medium utilization analysis graph is constructed by designating the packet stream with the highest stream medium utilization as a root node. The network path modification unit 110 can construct the medium utilization analysis graph. FIG. 7B depicts an example medium utilization analysis graph 730 that corresponds to the sorted packet stream table 700 of FIG. 7A. In FIG. 7A, for the current source interface I/F 1, the packet stream S1 was deemed to be associated with the highest stream medium utilization of 10 Mbps. Therefore, in the medium utilization analysis graph 730 of FIG. 7B, the root node 732 corresponds to the packet stream S1. As depicted in FIG. 7B, the medium utilization analysis graph 730 comprises multiple "levels," each level comprises one or more "nodes," and each node in a particular level is connected to one or more other nodes of the next level via an "edge." The level can represent the number of packet streams that have been analyzed. Each of the nodes at a particular level can represent one packet stream associated with the current source interface. The edge can represent a medium utilization of a potential source interface assuming that the packet stream (i.e., the node from which the edge originates) is migrated to the potential source interface. Thus, nodes and levels can be added to the medium utilization analysis graph 730 in decreasing order of the stream medium utilization of the packet streams associated with the current source interface 112. Operations for constructing the medium utilization analysis graph 730 and for identifying one or more packet streams that should be migrated from the current source interface 112 will further be described below. Referring back to FIG. 3, the flow continues at block 312.

At block 312, the hybrid network device identifies one or more potential source interfaces of the hybrid network device to which the selected packet stream can be migrated. With reference to the example of FIG. 1, the network path modification unit 110 can identify one or more potential source interfaces of the hybrid device 102. In some implementations, all of the remaining network interfaces 114 and 116 of the hybrid device 102 (i.e., those that are not the current source interface 112) can be designated as potential source interfaces. In another implementation, a subset of network interfaces of the hybrid device 102 that are compatible with the destination device can be designated as potential source interfaces. In another implementation, a subset of the network interfaces of the hybrid device 102 that comprise at least a threshold amount of available bandwidth (e.g., the network interfaces that are associated with a medium utilization that is less than the corresponding medium utilization threshold) can be designated as potential source interfaces. Referring to the medium utilization analysis graph 730 of FIG. 7B, the number of edges originating from a packet stream node can indicate the number of potential source interfaces associated with the packet stream (represented by the packet stream node). In other words, the number of edges originating from a packet stream node can indicate the number of network interfaces to which the packet stream can potentially be migrated from the current source interface. In the medium utilization analysis graph 730, three edges originate from the root node 732. The three edges 738A, 738B, and 738C are associated with potential source interfaces I/F 2, I/F 3, and I/F 4 to which the packet stream S1 can potentially be migrated from the current source interface I/F 1. Referring back to FIG. 3, the flow continues at block 314.

At block 314, a new medium utilization of each of the potential source interfaces is estimated in response to shifting the selected packet stream to the potential source interface. For example, the network path modification unit 110 can simulate migration of the packet stream to each of the potential source interfaces. Accordingly, for each of the potential source interfaces, the network path modification unit 110 can estimate the new medium utilization of the potential source interface. Referring now to FIG. 7B, the network path modification unit 110 determines that there are three potential source interfaces I/F 2, I/F 3, and I/F 4 for the packet stream S1. As described above, the network path modification unit 110 can construct the medium utilization analysis graph 730 as comprising three edges 738A, 738B, and 738C (corresponding to the potential source interfaces I/F 2, I/F 3, and I/F 4) originating from the packet stream node 732. Each edge can be associated with the estimated new medium utilization of the potential source interface. As described above, the estimated new medium utilization of the potential source interface can represent the medium utilization of the potential source interface if the selected packet stream S1 is migrated from the current source interface I/F 1 to the potential source interface (i.e., if the selected packet stream S1 is transmitted via the potential source interface instead of via the current source interface). With reference to FIG. 7B, the network path modification may determine that migrating the packet stream S1 from the current source interface I/F 1 to the potential source interface I/F 2 may cause the medium utilization of the potential source interface I/F 2 to increase to 15 Mbps (see the edge 738A). The network path modification unit 110 can estimate that the new medium utilization of the potential source interface I/F 3 will be 30 Mbps if the packet stream S1 is migrated to the potential source interface I/F 3 (see the edge 738B). The network path modification unit 110 can estimate that the new medium utilization of the potential source interface I/F 4 will be 40 Mbps if the packet stream S1 is migrated to the potential source interface I/F 4 (see the edge 738C). From block 314 in FIG. 3, the flow continues at block 316 in FIG. 4.

At block 316 in FIG. 4, it is determined whether the estimated new medium utilization of any of the potential source interfaces is less than the corresponding medium utilization threshold. For example, the network path modification unit 110 can compare the estimated new medium utilization of the potential source interfaces (determined at block 314) against the corresponding medium utilization thresholds. In some implementations, each of the network interfaces (and consequently each of the corresponding communication media) can be associated with a different medium utilization threshold (e.g., because each of the communication media are associated with a different capacity and different performance/throughput requirements). In comparing the estimated new medium utilization of the potential source interfaces against the corresponding medium utilization thresholds, the network path modification unit 110 can determine whether migrating the selected packet stream to a potential source interface will cause the potential source interface to become oversubscribed and exceed its medium utilization threshold. If it is determined that the medium utilization of at least one of the potential source interfaces is less than the corresponding medium utilization threshold, the flow continues at block 318. Otherwise, if it is determined that the estimated medium utilization of none of the potential source interfaces is less than the corresponding medium utilization thresholds, then the selected packet stream cannot be migrated and the flow continues at block 324.

At block 318, one or more of the potential source interfaces that are associated with a medium utilization that is greater than the medium utilization threshold are identified and discarded from the medium utilization analysis graph. With reference to FIG. 7B, the network path modification unit 110 can discard one or more edges of the medium utilization analysis graph 730 if the estimated medium utilization of a potential source interface that corresponds to the edge exceeds the corresponding medium utilization threshold. One or more edges of the medium utilization analysis graph 730 may also be discarded if it is not permissible to transmit the packet stream from the potential source interface that corresponds to the edge. As described above with reference to block 314, if the medium utilization thresholds associated with the potential source interfaces I/F 2, I/F 3, and I/F 4 are 25 Mbps, 30 Mbps, and 35 MBps respectively, the network path modification unit 110 can determine that migrating the packet stream S1 to the interfaces I/F 3 and I/F 4 will cause the medium utilization of these potential source interfaces to exceed their corresponding medium utilization thresholds if the packet stream S1 is migrated to the corresponding potential source interface. Accordingly, the network path modification unit 110 can determine that the packets stream S1 should not be migrated to the potential source interfaces I/F 3 and I/F 4 and can discard the edges 738B and 738C in the medium utilization analysis graph 730. In some implementations, the network path modification unit 110 can use other suitable techniques to determine whether the selected packet stream can be migrated to each of the potential source interfaces. For example, the network path modification unit 110 can calculate a path metric associated with the potential source interface based, at least in part, on the medium utilization and link capacities. The network path modification unit 110 can then determine to discard the edges (and effectively to not move the packet stream to those potential source interfaces) that are associated with a path metric that is greater than or equal to a path metric threshold. Referring back to FIG. 4, the flow continues at block 320.

At block 320, the medium utilization of the current source interface if the packet stream is migrated from the current source interface to one of the potential source interfaces is estimated. For example, the network path modification unit 110 can estimate the medium utilization of the current source interface 112 assuming that the selected packet stream is migrated to one of the potential source interfaces. The flow continues at block 322.

At block 322, it is determined whether the estimated medium utilization of the current source interface is greater than the medium utilization threshold if the packet stream is migrated. For example, the network path modification unit 110 can determine whether the estimated medium utilization of the current source interface 112 (determined at block 320) is greater than the corresponding medium utilization threshold if the packet stream is migrated. In other words, the network path modification unit 110 can determine whether shifting the selected packet stream to one of the potential source interfaces will reduce the medium utilization of the current source interface 112 below the medium utilization threshold (i.e., eliminate oversubscription of the communication medium associated with the current source interface 112). If it is determined that the estimated medium utilization of the current source interface is greater than the medium utilization threshold, the flow continues at block 324. Otherwise, the flow continues at block 326.

At block 324, the next packet stream associated with the current source interface is selected for analysis. The flow 300 moves from block 322 to block 324 in response to determining that shifting the previously selected packet stream from the current source interface 112 to a potential source interface will not eliminate oversubscription of the communication medium associated with the current source interface. The network path modification unit 110 can iteratively analyze and attempt to migrate the packet streams associated with the current source interface 112 in decreasing order of the stream medium utilization until the communication medium associated with the current source interface 112 is not oversubscribed. In some implementations, the communication medium can be considered to be oversubscribed if the medium utilization of the communication medium exceeds the total capacity of the communication medium. In other implementations, the communication medium can be considered to be oversubscribed if the medium utilization of the communication medium exceeds the medium utilization threshold associated with the communication medium. By iteratively constructing the medium utilization analysis graph 730 as described above in blocks 312-324, the number of packets streams to be analyzed can be minimized, a minimum number of packet streams that should be migrated from the current source interface can be identified in a minimum number of iterations, and solutions that do not meet performance criteria (e.g., packet streams that cannot be migrated, potential source interfaces that cannot support migration of the selected packet streams, etc.) can be discarded. After the next packet stream to be analyzed is selected, the flow loops back to block 312 in FIG. 4.

With reference to the example of FIG. 7A, the network path modification unit 110 can determine (e.g., from the sorted packet stream table 700) that the packet stream S5 should be analyzed as the next packet stream. With reference to FIG. 7B, the network path modification unit 110 can determine that network interfaces I/F 2 and I/F 5 are the potential source interfaces associated with the packet stream S5. In other words, the network path modification unit 110 can determine that the packet stream S5 can potentially be migrated to either the network interface I/F 2 or the network interface I/F 5. The network path modification unit 110 can simulate migration of the packet stream S5 from the current source interface I/F 1 to each of the potential source interfaces I/F 2 and I/F 5. The network path modification unit 110 can estimate the new medium utilization of the potential source interfaces I/F 2 and I/F 5, represented by edges 740A and 740B respectively. With reference to FIG. 7B, assuming that the previous packet stream S1 was migrated to the potential source interface I/F 2, the network path modification unit 110 can estimate that the new medium utilization of the potential source interface I/F 2 will be 24 Mbps if the packet stream S5 is migrated to the potential source interface I/F 2 (see the edge 740A). Likewise, assuming that the packet stream S1 was migrated to the potential source interface I/F 2, the network path modification unit 110 can estimate that the medium utilization of the potential source interface I/F 5 will be 35 Mbps if the packet stream S5 is migrated to the potential source interface I/F 5 (see the edge 740B). FIG. 7B also depicts that the network path modification unit 110 can analyze and attempt to migrate the next packet stream S3 if the medium utilization of the current source interface I/F 1 does not fall below the medium utilization threshold after the packet streams S1 and S5 are migrated to other network interfaces. At node 736A, the packet stream S3 is analyzed assuming packet stream S1 is migrated to the potential source interface I/F 2 and the packet stream S5 is migrated to the potential source interface I/F 2. At node 736B, the packet stream S3 is analyzed assuming that packet stream S1 is migrated to the potential source interface I/F 2 and the packet stream S5 is migrated to the potential source interface I/F 5. As described above in FIG. 4, the estimated medium utilization of the current source interface can be compared (at block 322) against the medium utilization threshold after each packet stream is analyzed. With reference to FIG. 3-4, the flow 300 can move from block 322 to block 326 if the medium utilization of the current source interface falls below the medium utilization threshold. If the medium utilization of the current source interface is greater than the medium utilization threshold, then as described in block 324, the next packet stream is selected for analysis and the flow loops back to block 312 in FIG. 4.

At block 326, one or more packet streams associated with the current source interface are identified for migrating to one or more potential source interfaces based, at least in part, on the estimated medium utilizations of the current source interface and the potential source interfaces. For example, the network path modification unit 110 can identify one or more packet streams of the current source interface and the corresponding potential source interface to which the identified packet streams should be migrated. As described above, a packet stream may be associated with one or more potential source interfaces. At block 326, the network path modification unit 110 can identify one of the potential source interfaces to which the packet stream should be migrated (e.g., a potential source interface associated with the smallest new medium utilization). The potential source interface that is selected is referred to herein as the "alternate network interface" associated with the packet stream. The network path modification unit 110 can initiate trace back operations on the medium utilization analysis graph 730 of FIG. 7B to identify the one or more packet streams that should be migrated to the corresponding one or more alternate network interfaces. Along the medium utilization analysis graph 730, the network path modification unit 110 can start from the edge of the last packet stream node having the smallest path metric (e.g., associated with the smallest medium utilization). The network path modification unit 110 can successively select the edges (and consequently the appropriate alternate network interface for each packet stream) associated with the smallest path metric (e.g., the smallest medium utilization) until the root node is reached. With reference to FIG. 7B, the network path modification unit 110 can first compare the path metrics associated with the edges 740A and 740B originating from the packet stream node 734 (that corresponds to the packet stream S5). As described above, the edge 740A is associated with a path metric of 24 Mbps and the edge 740B is associated with a path metric of 15 Mbps. Consequently, the network path modification unit 110 can determine that the edge 740B is associated with the smallest path metric and can select the edge 740B. Next, the network path modification unit 110 can select the edge 738A originating from the root node 732 (e.g., because the other edges 738B and 738C originating from the root node 732 were discarded at block 318 for exceeding medium utilization thresholds). By selecting the edges 740B and 738A, the network path modification unit 110 can determine that the packet stream S1 should be migrated to the alternate network interface I/F 2 (corresponding to the edge 738A) and that the packet stream S5 should be migrated to the alternate network interface I/F 5 (corresponding to the edge 740B). The flow continues at block 328.

At block 328, the one or more packet streams are migrated from the current source interface to the appropriate network interfaces. For example, the communication unit 104 can migrate the one or more packet streams (identified at block 326) from the current source interface to the corresponding one or more alternate network interfaces. With reference to the example of FIG. 7B, the network path modification unit 110 can indicate (e.g., to a routing unit of the communication unit 104) that the packet stream S1 should be transmitted via the network interface I/F 2 and that the packet stream S5 should be transmitted via the network interface I/F 5. From block 328, the flow ends.

Although FIGS. 3 and 4 describe operations for network path modification (also referred to as packet flow re-ordering operations) based on the medium utilization across the network interfaces (and the corresponding communication media) of the hybrid device 102, embodiments are not so limited. In other implementations, the priority of the packet streams associated with the current source interface can also be taken into consideration in determining whether/when to migrate packet streams from the current source interface to a potential source interface. The network path modification unit 110 can attempt to minimize migration of higher priority packet streams at the expense of low priority packet streams, as will be further described in FIGS. 5 and 6.

Figure 5:
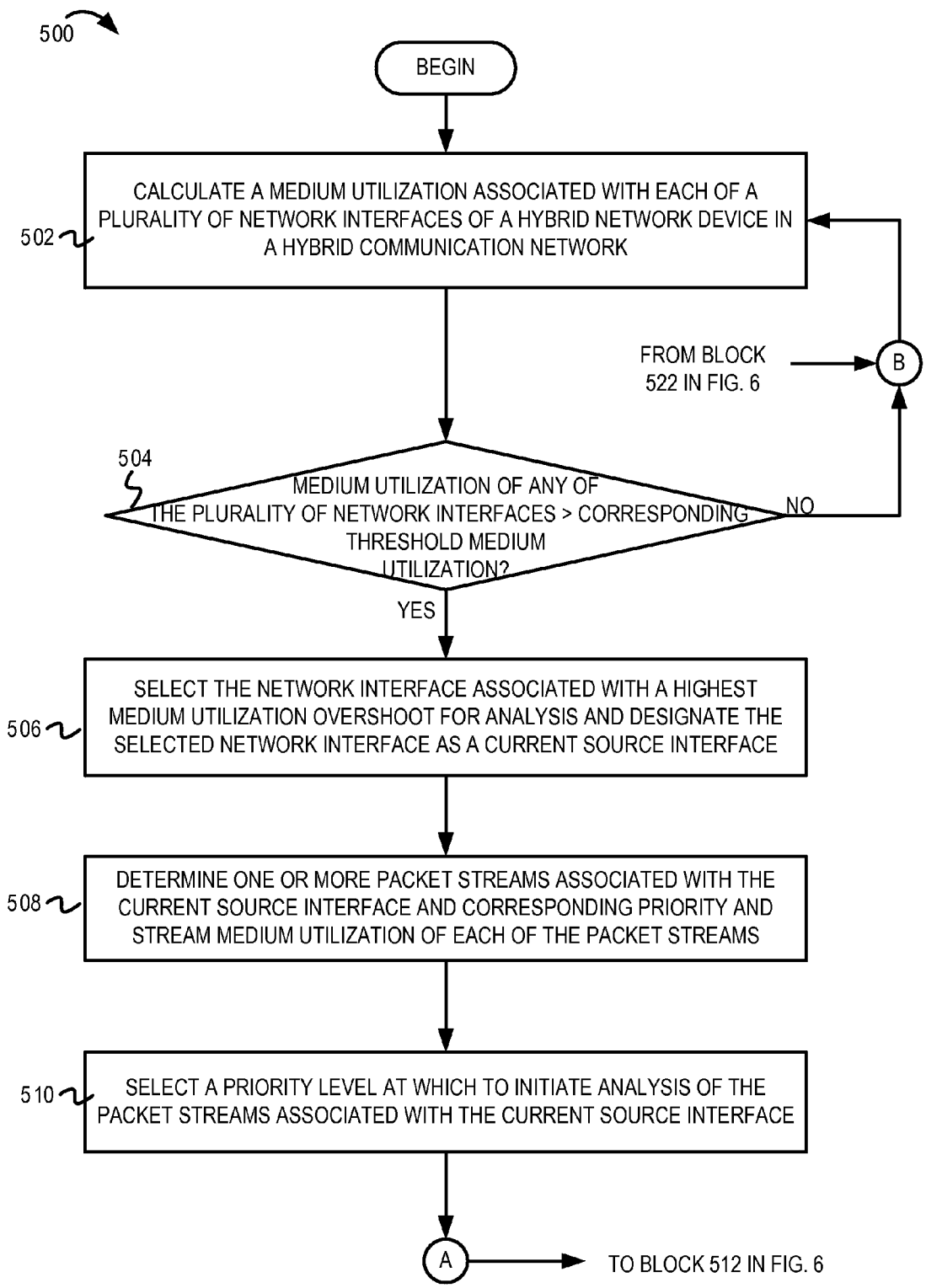
FIG. 5 is a flow diagram illustrating example operations for balancing medium utilization across network interfaces of a hybrid network device.
Figure 6:
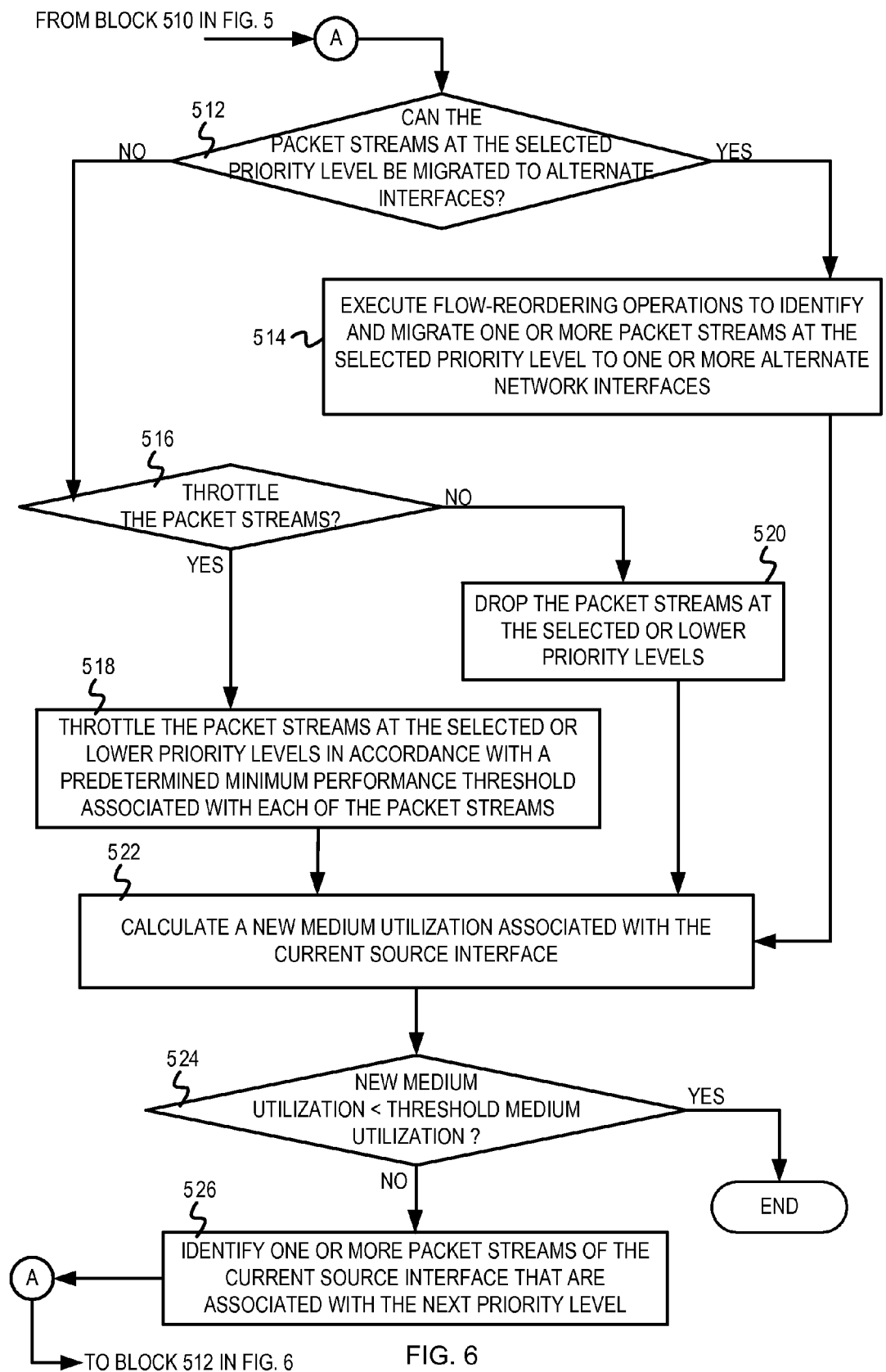
FIG. 6 is a continuation of FIG. 5 and also illustrates example operations for balancing medium utilization across network interfaces of a hybrid network device.

FIG. 5 and FIG. 6 depict a flow diagram 500 illustrating example operations for balancing medium utilization across network interfaces of a hybrid network device. The flow 500 begins at block 502 in FIG. 5.

At block 502, a medium utilization associated with each of a plurality of network interfaces of a hybrid network device is calculated. With reference to the example of FIG. 1, the network path modification unit 110 can calculate the medium utilization associated with each of the plurality of network interfaces 112, 114, and 116. As described above with reference to block 302 of FIG. 3, in determining the medium utilization associated with the network interfaces 112, 114, and 116, the network path modification unit 110 can determine the medium utilization associated with each of the communication media that correspond to the network interfaces 112, 114, and 116. The flow continues at block 504.

At block 504, it is determined whether the medium utilization of any of the plurality of network interfaces is greater than the corresponding medium utilization threshold. For example, the network path modification unit 110 can determine whether the medium utilization of any of the network interfaces 112, 114, and 116 is greater than the corresponding medium utilization threshold. If it is determined that the medium utilization of at least one of the plurality of network interfaces is greater than the corresponding medium utilization threshold, the flow continues at block 506. Otherwise, the flow loops back to block 502 where the network path modification unit 110 can continue to monitor the medium utilization associated with each of the network interfaces 112, 114, and 116.

At block 506, the network interface that is associated with a highest medium utilization overshoot is selected for analysis and is designated as a current source interface. In some implementations, the network path modification unit 110 can determine the medium utilization overshoot as the difference between the current medium utilization (e.g., current bandwidth consumption) determined at block 502 and the medium utilization threshold. With reference to FIG. 1, the network path modification unit 110 can determine that the network interface 112 is associated with the highest medium utilization overshoot. The network path modification unit 110 can select the network interface 112 for analysis and can designate the selected network interface 112 as the current source interface. The network path modification unit 110 can attempt to decrease the medium utilization of the current source interface 112 below the medium utilization threshold as will be described below in blocks 508-512. The flow continues at block 508.

At block 508, one or more packet streams associated with the current source interface and corresponding priority of each of the packet streams are determined. For example, the network path modification unit 110 can determine that the packet streams 118, 120, and 122 are associated with (i.e., originate from or are transmitted via) the current source interface 112. In some implementations, the network path modification unit 110 may determine the priority associated with each of the packet streams 118, 120, and 122 based on an indication from applications that generated each of the packet streams. The network path modification unit 110 can also determine the stream medium utilization associated with the packet streams 118, 120, and 122 (e.g., similarly as was described above with reference to FIGS. 3-4). In other words, the network path modification unit 110 can determine the amount of bandwidth being consumed by each of the packet streams 118, 120, and 122. The flow continues at block 510.

At block 510, a priority level at which to initiate analysis of the packet streams associated with the current source interface is identified. In some implementations, the network path modification unit 110 can identify the lowest priority level as the priority level at which to initiate analysis of the current source interface 112. In other words, the network path modification unit 110 can determine that the packet streams (transmitted from the current source interface 112) associated with the lowest priority should be analyzed first (and migrated to other network interfaces, throttled, or dropped) to attempt to reduce the medium utilization associated with the current source interface 112. In some implementations, in addition to selecting the priority level at which to initiate analysis of the packet streams associated with the current source interface 112, the network path modification unit 110 can also identify the packet streams associated with the selected priority level. For example, the network path modification unit 110 can identify a subset of the packet streams originating from the current source interface 112 that are associated with the selected priority level. The network path modification unit 110 can determine the stream medium utilization associated with the packet streams at the selected priority level and can sort the packet streams at the selected priority level in decreasing order of their stream medium utilization (as described above in block 308 of FIG. 3). The flow continues at block 512 in FIG. 6.

At block 512, it is determined whether the packet streams at the selected priority level can be migrated to alternate network interfaces. For example, the network path modification unit 110 can determine whether the packet streams at the selected priority level can be migrated to alternate network interfaces. For each of the packet streams, the network path modification unit 110 can determine whether the destination device supports transmission of the packet stream via another network interface, whether the medium utilization associated with the other network interfaces exceeds their corresponding medium utilization threshold, etc. (e.g., similarly as was described above with reference to FIGS. 3-4). If it is determined that at least a subset of the packet streams at the selected priority level can be migrated to alternate interfaces, the flow continues at block 514. Otherwise, if it is determined that none of the packet streams at the selected priority level can be migrated to alternate interfaces, the flow continues at block 516.

At block 514, flow-reordering operations are executed to identify and migrate one or more packet streams at the selected priority level to one or more alternate network interfaces. The flow 500 moves from block 512 to block 514 if it is determined that at least a subset of the packet streams at the selected priority level can be migrated to alternate network interfaces. For example, the network path modification unit 110 can execute the packet flow re-ordering operations of FIGS. 3-4 to identify and migrate one or more packet streams at the selected priority level to the corresponding alternate network interface. The flow continues at block 520.

At block 516, it is determined whether the packet streams at the selected priority level can be throttled. The flow 500 moves from block 512 to block 516 if it is determined that none of the packet streams at the select priority level can be migrated to alternate network interfaces. Packet streams are typically associated with minimum acceptable performance measurements referred to herein as "predetermined minimum performance thresholds." The minimum performance thresholds may be user-defined (e.g., the minimum data rate at which a packet can be transmitted, a minimum throughput, etc.), application-specific (e.g., based on requirements/specifications of the destination application), and/or determined by the destination device (e.g., the minimum data rate that can be supported by the destination device). Throttling the packet streams can refer to reducing the performance (e.g., throughput) associated with the packet stream to the predetermined minimum performance threshold (e.g., the minimum acceptable throughput). For example, in determining whether the packet stream can be throttled, the network path modification unit 110 can determine whether the packet stream can be transmitted at the lowest acceptable data rate.

In some implementations, as part of determining whether the packet streams can be throttled, the network path modification unit 110 can determine whether the communication medium (associated with the current source interface 112) comprises sufficient bandwidth to support throttling of the packet streams. For example, the network path modification unit 110 can determines that the packet stream is currently associated with a stream medium utilization of 40 Mbps and that the packet stream will have a stream medium utilization of 10 Mbps after throttling. Consequently, the network path modification unit 110 can determine whether throttling the packet stream (i.e., dropping the medium utilization of the packet stream from 40 Mbps to 10 Mbps) will eliminate medium oversubscription. If so, the network path modification unit 110 can determine that the packet stream should be throttled. In some implementations, as described herein, depending on the amount by which the communication medium is oversubscribed, the network path modification unit 110 can determine to drop one or more packet streams, throttle one or more packet streams, and/or migrate one or more packet streams to alternate network interfaces. In some implementations, the network path modification unit 110 can determine whether the packet streams at priority levels that are lower than the selected priority level ("lower priority levels") can be throttled. For example, if the selected priority level is level 3, the network path modification unit 110 can determine whether the packet streams at priority levels 0-2 can be throttled. In another implementation, the network path modification unit 110 can determine whether the packet streams at the selected priority level can be throttled. If it is determined that one or more packet streams can be throttled, the flow continues at block 518. Otherwise, the flow continues at block 520.

At block 518, the packet streams at the selected or lower priority levels are throttled in accordance with the predetermined minimum performance threshold associated with each of the packet streams. The flow 500 moves from block 516 to block 518 in response to determining that one or more packet streams can be throttled. In one example, the network path modification unit 110 can determine the minimum bandwidth (or throughput or other suitable performance measurement) at which the packet streams can be successfully transmitted to the destination device. The network path modification unit 110 can then vary one or more transmission parameters of the packet streams (e.g., decrease the data transmission rate of the packet streams) so that the packet streams are transmitted at the minimum acceptable performance level. In some implementations, the network path modification unit 110 can throttle packet streams at the selected priority level only if all the packet streams (originating from the current source interface 112) at the lower priority levels have already been throttled. In other implementations, the network path modification unit 110 can throttle packet streams at the selected priority level only if all the packet streams (originating from the current source interface 112) at the lower priority levels have already been dropped. The flow continues at block 522.

At block 520, the packet streams at the selected or lower priority levels are dropped. The flow 500 moves from block 516 to block 520 in response to determining that the packet streams cannot be throttled. For example, the network path modification unit 110 may determine that the transmission parameters of the packet streams cannot be varied, that the packet streams are already being transmitted at minimum bandwidth, that the packet streams are already being transmitted at their lowest acceptable performance level, etc. In response to determining that the packet streams cannot be throttled, the network path modification unit 110 can cause the hybrid device 102 to drop (i.e., temporarily stop transmitting) one or more packets streams at lower priority levels (if available) and/or at the selected priority level. It is noted that in some implementations, the network path modification unit 110 may drop the packet stream only if the medium utilization exceeds a predetermined threshold, if none of the packet streams can be throttled, or if none of the packet streams can be migrated to other network interfaces. In some implementations, the network path modification unit 110 can drop packet streams at the selected priority level only if all the packet streams (originating from the current source interface 112) at the lower priority levels have already been dropped. The flow continues at block 522.

At block 522, a new medium utilization associated with the current source interface is calculated. For example, the network path modification unit 110 can calculate the new medium utilization associated with the current source interface. The flow 500 moves from block 514 to block 522 after one or more packet streams at the selected priority level are migrated from the current source interface 112. The flow 500 moves from block 518 to block 522 after one or more packet streams (i.e., the bandwidth consumed by the packet streams) at the selected or lower priority levels are throttled. The flow 500 also moves from block 520 to block 522 after one or more packet streams at the selected or lower priority levels are dropped. The network path modification unit 110 can calculate the new medium utilization of the current source interface 112 (as described above in block 502) to determine whether executing at least one of the afore-mentioned operations eliminated the medium utilization overshoot of the current source interface 112. The flow continues at block 524.

At block 524, it is determined whether the new medium utilization is less than the medium utilization threshold. For example, the network path modification unit 110 can determine whether the new medium utilization associated with the current source interface 112 (calculated at block 522) is less than the corresponding medium utilization threshold. If it is determined that the new medium utilization is less than the medium utilization threshold, the flow ends. It is noted that in some implementations, after the medium utilization associated with the current source interface is deemed to be less than the medium utilization threshold, the flow can loop back to block 502 in FIG. 5 and the network path modification unit 110 can continue to monitor the medium utilization associated with each of the network interfaces. If it is determined that the new medium utilization is greater than the medium utilization threshold, the flow continues at block 526.

At block 526, one or more packet streams of the current source interface that are associated with the next priority level are identified. The flow 500 moves from block 524 to block 526 in response to determining that the new medium utilization associated with the current source interface 112 is still greater than the medium utilization threshold. From block 526, the flow continues at block 512 in FIG. 5, where the network path modification unit 110 executes operations described in blocks 512-526 for determining whether to migrate/throttle/drop the packet streams at the next priority level.

It should be noted that in some implementations, for a selected priority level, the network path modification unit 110 can throttle/drop packet streams associated with one or more lower priority levels (without attempting to first migrate the packet streams associated with the lower priority levels) based, at least in part, on the amount of medium overshoot associated with the communication medium (that corresponds to the current source interface). FIG. 7C illustrates a plurality of example medium utilization thresholds for determining when/whether to drop packet streams at one or more priority levels. In some implementations, the response time of the packet flow re-ordering operations (described above in FIGS. 3-6) to medium oversubscription events can be improved by gauging the medium utilization overshoot and accordingly determining how to deal with different priority packet streams originating from the current source interface based on the extent of medium utilization overshoot.

The network path modification unit 110 can determine whether to execute the packet flow re-ordering operations described in FIGS. 3-6 based, at least in part, on the medium utilization overshoot. If the medium utilization overshoot is very high (e.g., close to 100% medium utilization), successively analyzing all the packet streams beginning at the low priority packet streams can cause the communication medium to reach 100% medium utilization and can drastically affect the performance of all the packet streams (i.e., the high priority and the low priority packet streams). Determining which priority levels should be dropped and which priority levels should be analyzed can help ensure that the high priority (e.g., more important) packet streams are protected (e.g., in terms of performance and throughput) albeit at the expense of low priority packet streams. FIG. 7C illustrates a medium utilization graph 750 illustrating medium utilization associated with the current source interface (that corresponds to a particular communication medium). The medium utilization graph 750 also depicts various medium utilization threshold levels. Threshold 752 is the lowest level that corresponds to the recommended maximum medium utilization. The recommended maximum medium utilization threshold 752 may be a predetermined randomly selected threshold. In some embodiments, the recommended maximum medium utilization threshold 752 may depend on the communication medium, the settling time associated with the communication medium, and other such factors. Threshold 760 is the highest level that corresponds to the maximum medium utilization (i.e., 100% medium utilization). The region between the recommended maximum medium utilization threshold 752 and the 100% medium utilization threshold 760 comprises (in the example of FIG. 7C) three intermediate medium utilization thresholds 754, 756, and 758. If the medium utilization overshoot exceeds the recommended maximum medium utilization threshold 752 but is less than the first intermediate medium utilization threshold 754 (represented as threshold X1), the network path modification unit 110 can execute the packet flow re-ordering operations for packet streams at a lowest priority level (e.g., priority level P0) and can attempt to migrate one or more of the packet streams at the lowest priority level without dropping any of the packet streams. If the medium utilization overshoot exceeds the first intermediate medium utilization threshold 754 but is less than the second intermediate medium utilization threshold 756 (represented as threshold X2), the network path modification unit 110 can throttle/drop packet streams associated with one or more low priority levels. In the example, of FIG. 7C, if the medium utilization overshoot lies between the first intermediate medium utilization threshold 754 and the second intermediate medium utilization threshold 756, the network path modification unit 110 can drop or throttle packet streams associated with two priority levels P0 and P1. If the communication medium is still oversubscribed (e.g., if the medium utilization overshoot is not less than the recommended maximum medium utilization threshold 752), the network path modification unit 110 can attempt to migrate one or more of the packet streams at the next priority level (e.g., priority level P2). If the medium utilization overshoot exceeds the second intermediate medium utilization threshold 754 but is less than the third intermediate medium utilization threshold 758 (represented as threshold X3), the network path modification unit 110 can successively throttle/drop packet streams associated with three lower priority levels P0, P1, and P2. In other words, the network path modification unit 110 can drop packet streams associated with the lowest priority level P0, then drop packet streams associated with the second lowest priority level P1 if the communication medium is still oversubscribed, then drop packet streams associated with the third lowest priority level P2 if the communication medium is still oversubscribed, etc. If the communication medium is still oversubscribed after dropping packet streams associated with the lower priority levels P0, P1, and P2, the network path modification unit 110 can attempt to migrate one or more of the packet streams at the next priority level (e.g., priority level P3). It is noted that the medium utilization thresholds and corresponding operations for determining when/whether to drop packet streams at one or more priority levels as depicted in FIG. 7C are examples. In other embodiments, the hybrid device 102 can be configured to adopt any suitable number of priority levels, number of medium utilization thresholds, values of the medium utilization thresholds, and/or the priority levels that are throttled/dropped as each medium utilization threshold.

Figure 8:
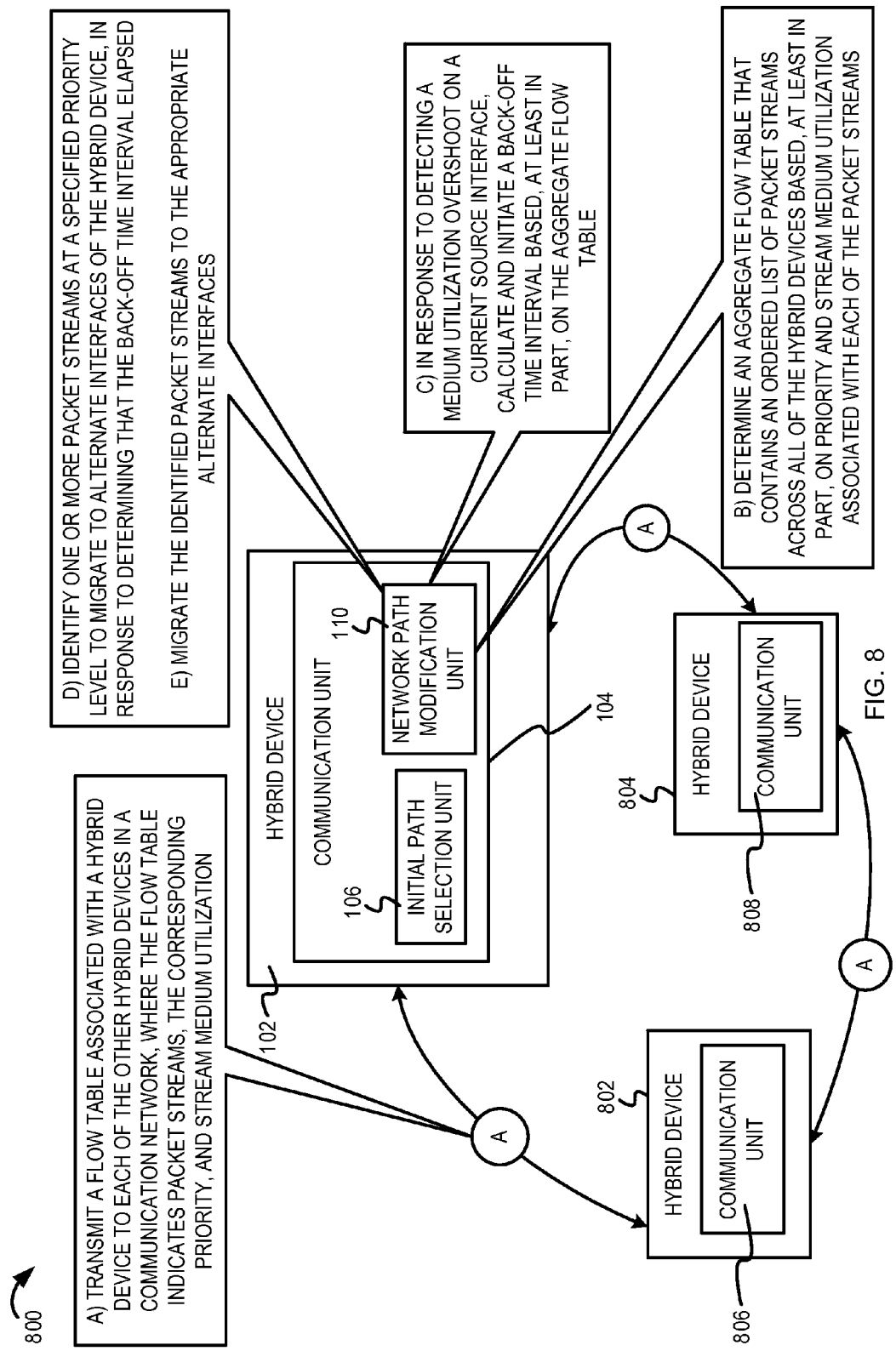
FIG. 8 is an example conceptual diagram illustrating a mechanism for minimizing race conditions associated with balancing medium utilization in a hybrid communication network.

FIG. 8 is an example conceptual diagram illustrating a mechanism for minimizing race conditions associated with balancing medium utilization in a hybrid communication network. The hybrid communication network 800 of FIG. 8 comprises the hybrid device 102 of FIG. 1 and hybrid devices 802 and 804. As described above with reference to FIG. 1, the hybrid device 102 comprises a communication unit 104. The communication unit 104 comprises an initial path selection unit 106 and a network path modification unit 110. The hybrid devices 802 and 804 also comprise a communication unit 806 and a communication unit 808 respectively. The communication units 806 and 808 can also each comprise an initial path selection unit and a network path modification unit, as described above with reference to the hybrid device 102. In some implementations, as described above with reference to FIG. 1, the hybrid devices 102, 802, and 804 can each be an electronic device such as a laptop computer, a tablet computer, a mobile phone, a smart appliance, a gaming console, an access point, or other suitable electronic devices with suitable communication capabilities (e.g., WLAN communication capabilities, powerline communication capabilities, Ethernet communication capabilities, etc.).

The hybrid devices 102, 802, and 804 typically share the communication media that constitute the hybrid communication network. For example, if the hybrid communication network 800 comprises a powerline medium, an Ethernet medium, and a WLAN medium, the hybrid device 102, 802, and 804 transmit/receive communications via the same powerline medium, the Ethernet medium, and the WLAN medium. Therefore, if one or more of the communication media (e.g., the powerline medium) becomes oversubscribed, all of the hybrid devices 102, 802, and 804 of the communication network 800 can detect oversubscription of the powerline medium. Consequently, as described above in FIGS. 1-7C, each of the hybrid devices 102, 802, and 804 may simultaneously attempt to migrate one or more of their respective packet streams from their PLC interface to other network interfaces (i.e., non-PLC interfaces). All the hybrid devices attempting to simultaneous reduce oversubscription of the shared powerline medium can result in oversubscription of another communication medium (e.g., the WLAN medium). This can result in a vicious cycle where all of the hybrid devices constantly detect oversubscription on one communication medium, attempt to migrate packet streams to eliminate oversubscription of that communication medium, cause and detect oversubscription on another communication medium as a result of simultaneous migration of the packet streams from the first communication medium, and so on. This scenario is referred to herein as a "race condition" in automatic network path selection and can cause performance degradation. The probability of race conditions in automatic network path selection can be reduced by desynchronizing the hybrid devices 102, 802, and 804 and by avoiding simultaneous reaction of hybrid devices 102, 802, and 804 to medium oversubscription events, as will be described below in stages A-E.

At stage A, the communication unit 104 transmits a flow table associated with the hybrid device 102 to each of the other hybrid devices 802 and 804 in the hybrid communication network 800. The flow table associated with the hybrid device 102 can indicate packet streams currently being transmitted by the hybrid device 102, the priority associated with each of the packet streams, and the stream medium utilization associated with each of the packet streams. In some implementations, the flow table can be a list of packet streams associated with the hybrid device 102 sorted on a per-interface, per-priority basis. In other words, if the hybrid device 102 comprise three network interfaces, the flow table can comprise a first set of packet streams (sorted in increasing order of priority) associated with a first network interface, a second set of packet streams (sorted in increasing order of priority) associated with a second network interface, and a third set of packet streams (sorted in increasing order of priority) associated with a third network interface. In some implementations, the list of packet streams in the flow table can also be sorted based on stream medium utilization. In other words, for each network interface and each priority level, the packet streams associated with the selected network interface and the selected priority level may be sorted in decreasing order of stream medium utilization. In another implementation, the flow table may not be a sorted list of packet streams. Instead, the flow table can comprise the packet streams (e.g., in random order, in the order in which the packet streams were initiated, etc.) including a packet stream identifier, a priority level associated with the packet stream, a network interface associated with the packet steam, and a stream medium utilization associated with the packet stream. In some implementations, the size of the flow table (e.g., the number of packet streams listed in the flow table) can be limited based on a minimum stream medium utilization per network interface. For example, if the minimum stream medium utilization for the Ethernet interface is 15 Mbps, the packet streams transmitted via the Ethernet interface that have a stream medium utilization that is less than 15 Mbps may not be listed in the flow table. As depicted in FIG. 8, the communication unit 806 can transmit the flow table associated with the hybrid device 802 to the hybrid devices 102 and 804. The communication unit 808 can transmit the flow table associated with the hybrid device 804 to the hybrid devices 102 and 802. It is noted that each of the hybrid devices 102, 802, and 804 can transmit an updated flow table each time a new packet stream is initiated, a packet stream is terminated, the priority level of a packet stream is modified, and/or the stream medium utilization associated with a packet stream changes.

At stage B, the network path modification unit 110 can determine an aggregate flow table that contains an ordered list of packet streams across all of the hybrid devices based, at least in part, on priority and stream medium utilization associated with each of the packet streams. In response to receiving the flow tables associated with the hybrid devices 802 and 804 (as described above in stage A), the network path modification unit 110 can construct the aggregate flow table that comprises all the packet streams sorted on a per-interface, per-priority, and/or per stream medium utilization basis. In other words, for a particular network interface (e.g., the PLC interface), the network path modification unit 110 can identify the packet streams associated with the PLC interface at the hybrid devices 102, 802, and 804. Next, the network path modification unit 110 can sort the identified packet streams associated with the PLC interface on a per-priority and per-medium utilization basis. For example, for each priority level, all the packet streams associated with the PLC interface at the selected priority level may be sorted in decreasing order of stream medium utilization. The network path modification unit 110 can continue to order the packet streams in the aggregate flow table until all the network interfaces, priority levels, and packet streams associated with all of the hybrid devices in the communication network 800 have been listed in the aggregate flow table. Likewise, each of the hybrid devices 802 and 804 can also determine the aggregate flow table as described above. Each of the hybrid devices 102, 802, and 804 can also be locally ranked (or assigned an "aggregate flow table index") based on the largest stream medium utilization of the packet flows (per priority level) originating from the hybrid device. For example, based on the aggregate flow table it may be determined that, for the PLC interface and priority level zero, the hybrid device 102 comprises a packet stream with a stream medium utilization of 30 Mbps, the hybrid device 802 comprises a packet stream with a stream medium utilization of 25 Mbps, and the hybrid device 804 comprises a packet stream with a stream medium utilization of 23 Mbps. Accordingly, the hybrid devices 102, 802, ad 804 can be assigned an aggregate flow table index (also referred to as the "rank" of the hybrid device) of "1," "2," and "3" respectively. In some implementations, the hybrid devices may also be assigned an aggregate flow table index for packet streams at higher priority levels. For example, for the PLC interface and priority level one, it may be determined that the hybrid device 102 comprises a packet stream with a stream medium utilization of 20 Mbps, the hybrid device 802 comprises a packet stream with a stream medium utilization of 25 Mbps, and the hybrid device 804 comprises a packet stream with a stream medium utilization of 10 Mbps. Accordingly, the hybrid devices 102, 802, and 804 can be assigned an aggregate flow table index of "5," "4," and "6" respectively. Thus, each of the hybrid devices can be ranked based on the medium utilization for the largest flow of that priority class. The aggregate flow table index (or rank) can be used to determine the back-off time interval at each hybrid device, as will be further described below.

At stage C, in response to detecting a medium utilization overshoot on a current source interface, the network path modification unit 110 calculates and initiates a back-off time interval based, at least in part, on the aggregate flow table. The hybrid device 102 that comprises the packet stream with the largest medium utilization at the selected priority level and the current source interface is given the first opportunity (e.g., by virtue of having the smallest back off time interval) to migrate one or more packet streams at the selected priority level. All the other hybrid devices 802 and 804 are configured to back-off (i.e., not execute the packet flow re-ordering operations described above in FIGS. 3-6) for a back-off time interval. The back-off time interval represents the time duration for which a hybrid device is configured to wait before it can execute the packet flow re-ordering operations and can migrate one or more packet streams associated with the current source interface. The back-off time interval can be calculated in accordance with Eq. 1.

$$\text{BackOff interval} = (\text{Aggregate flow table index} - 1) \\ * \text{MaxBackoff Interval} \qquad \text{Eq. 1}$$

As described above, the aggregate flow table index represents the rank of the hybrid device (within the range 1 to N), where N is the number of hybrid devices in the communication network 800. As described above in stage B, the hybrid devices can be ranked based on the maximum stream medium utilization of the packet stream sourced by the hybrid devices from the current source interface at a specified priority level and. The MaxBackoffInterval corresponds to the maximum time that may be required by a hybrid device to execute the packet flow re-ordering operations described above in FIGS. 3-6 to identify and migrate one or more packet streams to alternate network interfaces. The MaxBackoffInterval can take into consideration a maximum time interval that may be required for all the hybrid devices to detect medium oversubscription (e.g., the threshold detection interval), a maximum time interval for executing the packet flow re-ordering operations to identify the one or more packet streams to be migrated, and a maximum time interval for migrating the identified packet streams to appropriate alternate network interfaces. The MaxBackoffInterval can also include an additional buffer time interval (or settling time interval) to enable the communication medium (corresponding to the current source interface) to adjust to the changes (e.g., the migration of the one or more packet streams). In some examples, the maximum back-off time interval can be determined to be 2-3 seconds. In other examples, the maximum back-off time interval can be other suitable time interval depending on the aforementioned considerations. It is noted that the MaxBackoffInterval can be different for different priority levels. The MaxBackoffInterval can be a function of the total number of packet streams associated with the selected priority level.

As depicted by Eq. 1, the back-off time interval is typically proportional to the medium utilization of biggest packet stream. The back-off time interval can also be indicative of the priority of the packet streams of a hybrid device relative to the priority of the packet streams sourced by the other hybrid devices. The hybrid device that sources the biggest packet stream typically backs off the least. With reference to the example of stage B, where the hybrid devices 102, 802, and 804 can be assigned an aggregate flow table index of "1," "2," and "3" respectively, the hybrid device 102 can determine that its back-off time interval is 0, the hybrid device 802 can determine that its back-off time interval is MaxBackoffInterval, and the hybrid device 804 can determine that its back-off time interval 2*MaxBackoffInterval. Because the back-off time interval associated with the hybrid device 102 is "0," the network path modification unit 110 has the first opportunity to migrate one or more packet streams at the selected priority level. The hybrid devices 802 and 804 can load their respective back-off time intervals into a back-off timer and can start decrementing the back-off timer.

At stage D, the network path modification unit 110 identifies one or more packet streams at the selected priority level to migrate to alternate network interfaces of the hybrid device 102, in response to determining that the back-off time interval elapsed. As described above with reference to stage C, the network path modification unit 110 determines that the back-off time interval for the hybrid device 102 is zero and therefore, initiates packet flow re-ordering operations described above with reference to FIGS. 3-6. The network path modification unit 110 can identify one or more packet streams (at the selected priority level) associated with the current source interface that can be migrated to corresponding alternate network interfaces of the hybrid device 102. The network path modification unit 110 may be allocated only a predetermined time interval (e.g., typically equal to the MaxBackoffInterval) to execute the packet flow re-ordering operations, to identify one or more packet streams to be migrated, and to migrate the identified one or more packet streams to the appropriate one or more alternate network interfaces.

At stage E, the network path modification unit 110 migrates the identified packet streams to the appropriate alternate network interfaces. As described above with reference to FIGS. 3-6, the network path modification unit 110 can cause a routing unit (or another suitable processing unit of the hybrid device 102) to transmit the one or more identified packet streams via corresponding one or more alternate network interfaces. With reference to FIG. 1, the network path modification unit 110 determines to transmit the packet stream 122 via the alternate network interface 116 instead of via the current source interface 112.

It is noted that the network path modification unit 110 migrating the one or more packet streams at the selected priority level may not eliminate oversubscription of the communication medium. In this situation, if the network path modification unit 110 cannot eliminate oversubscription of the communication medium (associated with the current source interface), the network path modification unit 110 can migrate as many of the packet streams as possible without oversubscribing any of the other the network interfaces (i.e., without oversubscribing any of the other communication media that correspond to the other network interfaces). After the hybrid device 102 executes the packet flow re-ordering operations at the selected priority level (e.g., typically for a time interval that is approximately equal to MaxBackoffInterval), the hybrid device 102 can calculate and initiate a back-off time interval that is proportional to the next position (e.g., corresponding to the next priority level) of the hybrid device 102 in the aggregate flow table. With reference to the above example where the back-off time interval associated with the hybrid device 802 is determined to be MaxBackoffInterval, after the MaxBackoffInterval expires (e.g., after the back-off timer reaches zero), the hybrid device 802 can gain control. The hybrid device 802 can determine whether the communication medium is still oversubscribed, and if so, can attempt to migrate one or more of its packet streams at the selected priority level to reduce/eliminate oversubscription of the communication medium.

Figure 9:
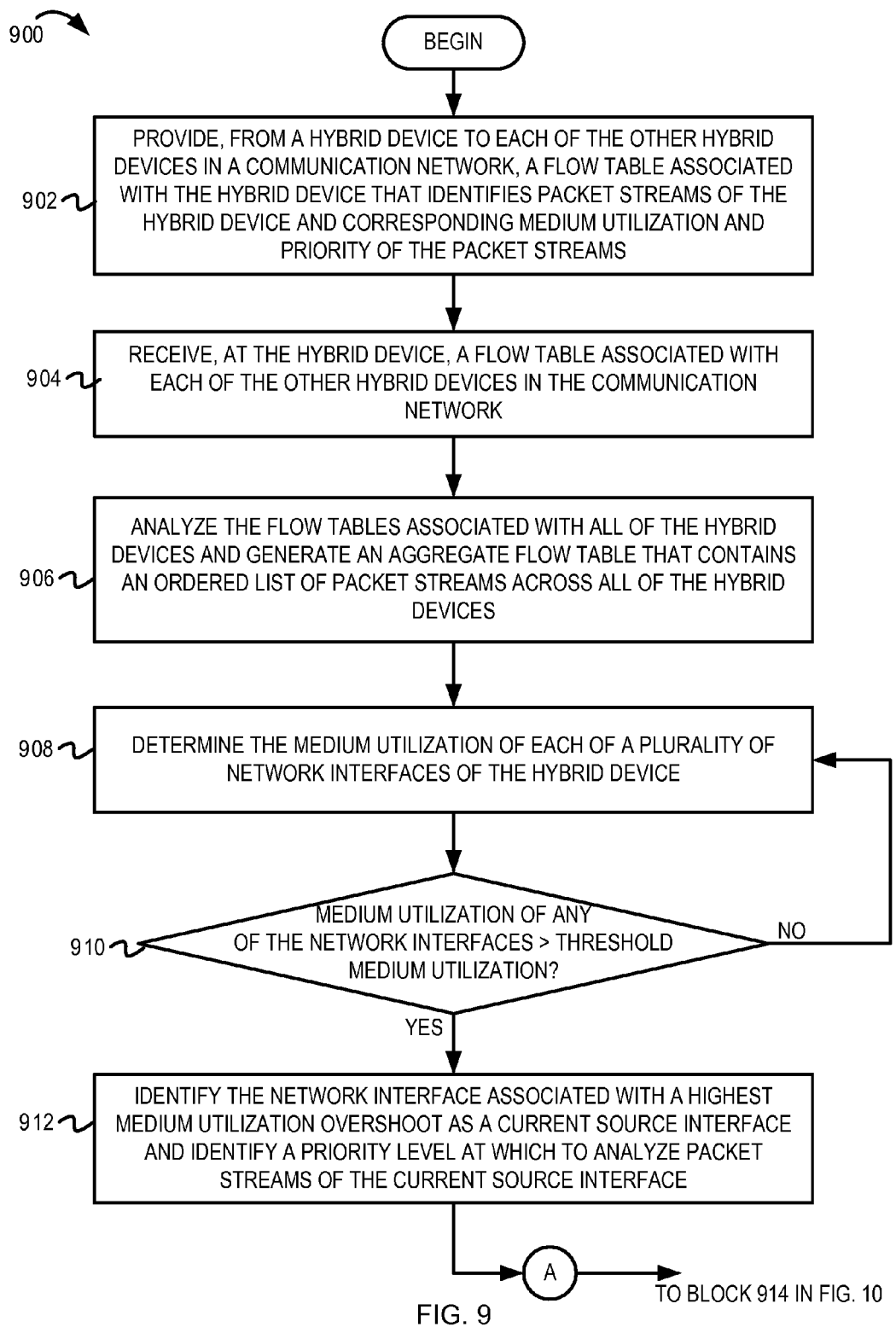
FIG. 9 is a flow diagram illustrating example operations of a distributed mechanism for balancing the medium utilization in a hybrid communication network.
Figure 10:
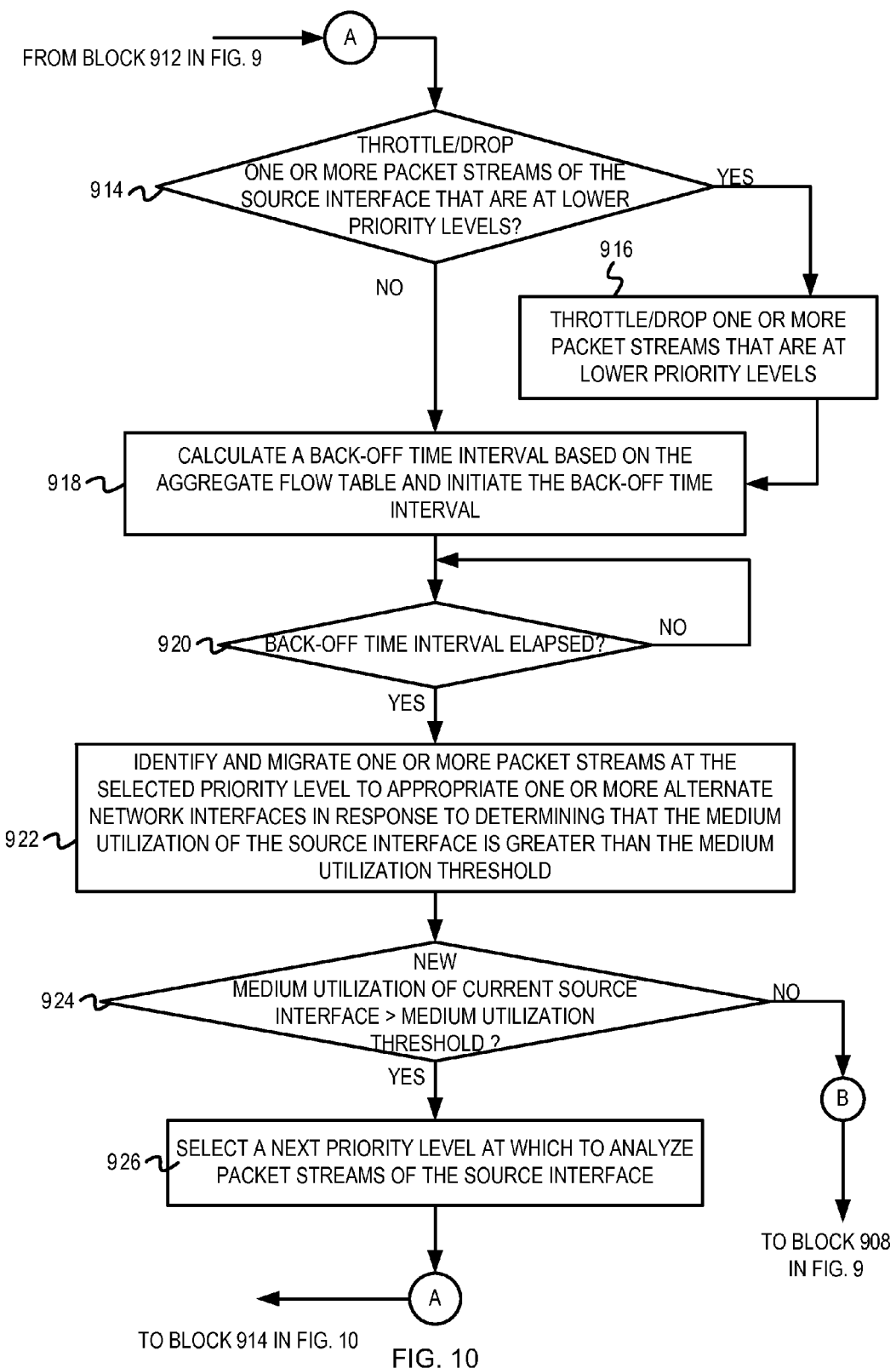
FIG. 10 is a continuation of FIG. 9 and also illustrates example operations of a distributed mechanism for balancing the medium utilization in a hybrid communication network.

FIG. 9 and FIG. 10 depict a flow diagram 900 illustrating example operations of a distributed mechanism for balancing the medium utilization in a hybrid communication network. The flow 900 begins at block 902 in FIG. 9.

At block 902, a hybrid device provides, to other hybrid devices in a communication network, a flow table associated with the hybrid device that identifies packet streams of the hybrid device and corresponding medium utilization and priority of the packet streams. With reference to the example of FIG. 8, the network path modification unit 110 can transmit a flow table associated with the hybrid device 102 to the other hybrid devices 802 and 804 of the communication network 800. As described above with reference to FIG. 8, the flow table associated with the hybrid device 102 can comprise an indication of the packet streams being transmitted by the hybrid device 102, a priority level associated with each of the packet streams, a stream medium utilization associated with each of the packet streams, and/or a network interface of the hybrid device 102 from which each of the packet streams is being transmitted. The packet streams may be sorted (in the flow table) in accordance with the network interface, the priority, and/or the stream medium utilization. The flow continues at block 904.

At block 904, the hybrid device receives a flow table associated with each of the other hybrid devices in the communication network. For example, the network path modification unit 110 can receive a flow table associated with the hybrid device 802 and a flow table associated with the hybrid device 804. As described above, the flow tables associated with the hybrid devices 802 and 804 can also comprise the packet streams transmitted by respective ones of the hybrid devices and can be sorted based on priority, the network interface via which the packet streams are transmitted, and/or the stream medium utilization. The flow continues at block 906.

At block 906, the flow tables associated with all of the hybrid devices are analyzed and an aggregate flow table that contains an ordered list of packet streams across all of the hybrid devices is generated. For example, the network path modification unit 110 can construct the aggregate flow table based, at least in part, on the flow tables associated with hybrid devices 102, 802, and 804. As described above with reference to stage B of FIG. 8, the aggregate flow table can be generated by sorting the packet streams associated with all of the hybrid devices 102, 802, and 804 based on the network interface, the priority and/or the stream medium utilization (determined based on analyzing the flow tables associated with all of the hybrid devices 102, 802, and 804). The flow continues at block 908.

At block 908, the medium utilization of each of a plurality of network interfaces of the hybrid device is determined. For example, the network path modification unit 110 of the hybrid device 102 can determine the medium utilization of each of a plurality of network interfaces of the hybrid device 102. In other words, the network path modification unit 110 of the hybrid device 102 can determine the medium utilization of each of a plurality of communication media that correspond to the plurality of network interfaces. For example, the hybrid device 102 may comprise three network interfaces—a WLAN interface that couples the hybrid device 102 to a WLAN, a PLC interface that couples the hybrid device 102 to a powerline network, and an Ethernet interface that couples the hybrid device 102 to the Ethernet. Consequently, the network path modification unit 110 can determine the medium utilization of the WLAN, the powerline network, and the Ethernet. The flow continues at block 910.

At block 910, it is determined whether the medium utilization of any of the network interfaces is greater than the corresponding medium utilization threshold. As described above, each of the network interfaces (i.e., the corresponding communication media) may be associated with a different medium utilization threshold. The medium utilization threshold can indicate an upper limit on the bandwidth that can be consumed by one or more packet streams on the communication medium while maintaining performance and throughput requirements of the packet streams. If it is determined that the medium utilization of one or more of the network interfaces is greater than the corresponding medium utilization threshold, the flow continues at block 912. Otherwise, it is determined that the medium utilization of all of the network interfaces is less than the corresponding medium utilization threshold and the flow loops back to block 908, where the network path modification unit 110 continues to monitor (continuously or periodically) the medium utilization associated with each of the network interfaces of the hybrid device 102.

At block 912, the network interface associated with a highest medium utilization overshoot is identified as a current source interface and priority level at which to analyze packet streams of the current source interface is selected. For example, in response to determining that the medium utilization associated with one or more of the network interfaces is greater than the corresponding medium utilization threshold, the network path modification unit 110 can designate the network interface associated with the highest medium utilization overshoot as the current source interface to be analyzed. Additionally, the network path modification unit 110 can select a priority level at which to analyze packet streams of the current source interface. In some implementations, the network path modification unit 110 can analyze the packet streams originating from the current source interface and beginning at the lowest priority level. In other implementations, the network path modification unit 110 can select the priority level at which to analyze the packet streams originating from the current source interface based on the medium overshoot associated with the communication medium that corresponds to the current source interface. In some implementations, the set of rules for selecting the priority level at which the packet streams should be analyzed may be in accordance with FIG. 7C, as was previously described above. For example, the network path modification unit 110 can select the priority level P3 and determine to analyze the packet streams associated with the priority level P3 if the medium overshoot is greater than the third intermediate medium utilization threshold 758 (i.e., the threshold X3). The flow continues at block 914 in FIG. 10.

At block 914, it is determined whether to throttle/drop one or more packet streams of the current source interface that are at lower priority levels. For example, the network path modification unit 110 can determine whether one or more packet streams that are associated with priority levels that are lower than the selected priority level should be dropped or throttled. In some implementations, if the selected priority level is the lowest priority level, the network path modification unit 110 may determine not to throttle/drop the packet streams associated with the lowest priority level. In some implementations, the network path modification unit 110 may determine whether to throttle/drop one or more packet streams at the lower priority levels depending on the medium utilization overshoot. For example, with reference to FIG. 7C, if the network path modification unit 110 determines that the selected priority level is P3 (as described above in block 212), the network path modification unit 110 can determine whether to throttle/drop the packet streams at the lower priority levels P0, P1 and P2 depending on the medium utilization overshoot. With reference to FIG. 7C, if the medium utilization overshoot associated with the current source interface is greater than the third intermediate medium utilization threshold 758, the network path modification unit 110 can determine to drop the packet streams at the lower priority levels P0, P1, and P2. If it is determined to throttle/drop one or more packet streams of the current source interface that are at lower priority levels, the flow continues at block 916. Otherwise, the flow continues at block 918.

At block 916, one or more packet streams that are at lower priority levels are throttled/dropped. The flow 900 moves from block 914 to block 916 if the network path modification unit 110 determines that one or more packet streams that are at lower priority levels should be throttled/dropped. As described above with reference to block 516 of FIG. 6, in determining whether to drop or throttle the packet streams at the lower priority levels, the network path modification unit 110 can first determine whether the packet streams at the lower priority levels can be throttled. The network path modification unit 110 can determine whether the packet streams are associated with a minimum acceptable performance/throughput, whether transmission parameters (e.g., transmission rate) of the packet streams can be varied in accordance with the minimum acceptable performance/throughput, etc. For example, the network path modification unit 110 may determine that the packet stream can be transmitted at a lower transmission rate and may accordingly drop the transmission rate of the packet rate to minimize the stream medium utilization of the packet stream. However, if the network path modification unit 110 determines that the packet stream at the lower priority level cannot be throttled (e.g., the packet stream is already at the minimum performance/throughput threshold, the performance/throughput of the packet stream cannot be decreased, the transmission parameters of the packet stream cannot be varied, etc.), the network path modification unit 110 may determine to drop the packet stream. In some implementations, the network path modification unit 110 can throttle/drop all the packet streams at the lower priority levels. In other implementations, the network path modification unit 110 can throttle/drop only a subset of the packet streams at the lower priority levels. In some implementations, the network path modification unit 110 can successively throttle/drop packet streams on a per-priority level basis. In other words, if the priority levels P0, P1, and P2 are the lower priority levels (in increasing order of priority) the network path modification unit 110 can first throttle/drop the packet streams associated with priority level P0, then throttle/drop the packet streams associated with priority level P1 (if the communication medium is still oversubscribed), and finally throttle/drop the packet streams associated with priority level P2 (if the communication medium is still oversubscribed). In some implementations, the network path modification unit 110 can throttle/drop packet streams associated with the lower priority levels on a per-stream medium utilization basis. For example, the network path modification unit 110 can sort the packet streams associated with the lower priority levels P0, P1, and P2 in decreasing order of stream medium utilization and can throttle/drop the packet streams in that order (i.e., begin dropping the packet streams with the highest stream medium utilization). In other implementations, the network path modification unit 110 can throttle/drop all the packet streams associated with the lower priority levels (P0, P1, and P2). The flow continues at block 918.

At block 918, a back-off time interval is calculated based on the aggregate flow table and the back-off time interval is initiated. The flow 900 moves from block 914 to block 918 if the network path modification unit 110 determines that one or more packet streams that are at lower priority levels should not be throttled/dropped. The flow 900 also moves from block 916 to block 918 after one or more packet streams at the lower priority levels are throttled/dropped. The network path modification unit 110 can calculate the back-off time interval based on the aggregate flow table (i.e., the aggregate flow table index associated with the hybrid device 102) and the selected priority level, as described above with reference to stage C and Eq. 1 of FIG. 8. The flow continues at block 920.

At block 920, it is determined whether the back-off time interval has elapsed. In one example as described above, the network path modification unit 110 can initiate a timer to keep track of the back-off time interval. The timer can trigger (or notify) the network path modification unit 110 when the back-off time interval elapses (i.e., when the timer reaches zero). If it is determined that the back-off time interval has elapsed, the flow continues at block 922. Otherwise, the flow loops back to block 920 where the network path modification unit 110 continues to determine whether the back-off time interval has elapsed.

At block 922, one or more packet streams at the selected priority level are migrated to appropriate one or more alternate network interfaces in response to determining that the medium utilization of the current source interface is greater than the threshold medium utilization. For example, the network path modification unit 110 can execute packet flow re-ordering operations described above in FIG. 3-6 for identifying one or more packet streams at the selected priority level that can be migrated to one or more corresponding alternate network interfaces. In some implementations, after the back-off time interval expires, the network path modification unit 110 can determine whether the medium utilization of the current source interface is greater than the medium utilization threshold. If so, the network path modification unit 110 can execute the packet flow re-ordering operations as described in block 922. The network path modification unit 110 can then transmit (or cause a routing unit to transmit) the one or more packet streams at the selected priority level via the appropriate alternate network interfaces instead of via the current source interface. It is noted that the network path modification unit 110 can calculate a new medium utilization of the current source interface after migrating the one or more packet streams at the selected priority level to the appropriate alternate network interfaces. The flow continues at block 924.

At block 924, it is determined whether the new medium utilization of the current source interface is greater than the medium utilization threshold. For example, the network path modification unit 110 can determine whether the new medium utilization of the current source interface is greater than the corresponding medium utilization threshold as described above in block 910 of FIG. 9. If it is determined that the new medium utilization is greater than the corresponding medium utilization threshold, the flow continues at block 926. Otherwise, the flow loops back to block 908 in FIG. 9, where the network path modification unit 110 continues to monitor the medium utilization associated with each of the network interfaces.

At block 926, a next priority level at which to analyze packet streams of the current source interface is selected. The flow 900 moves from block 924 to block 926 if it is determined that the medium utilization of the current source interface is greater than the medium utilization threshold. From block 926, the flow loops back to block 914 in FIG. 10 where the network path modification unit 110 throttles/drops packet streams associated with a priority level that is lower than the selected next priority level and/or migrates one or more packet streams associated with the selected priority level to corresponding one or more alternate network interfaces.

Figure 11:
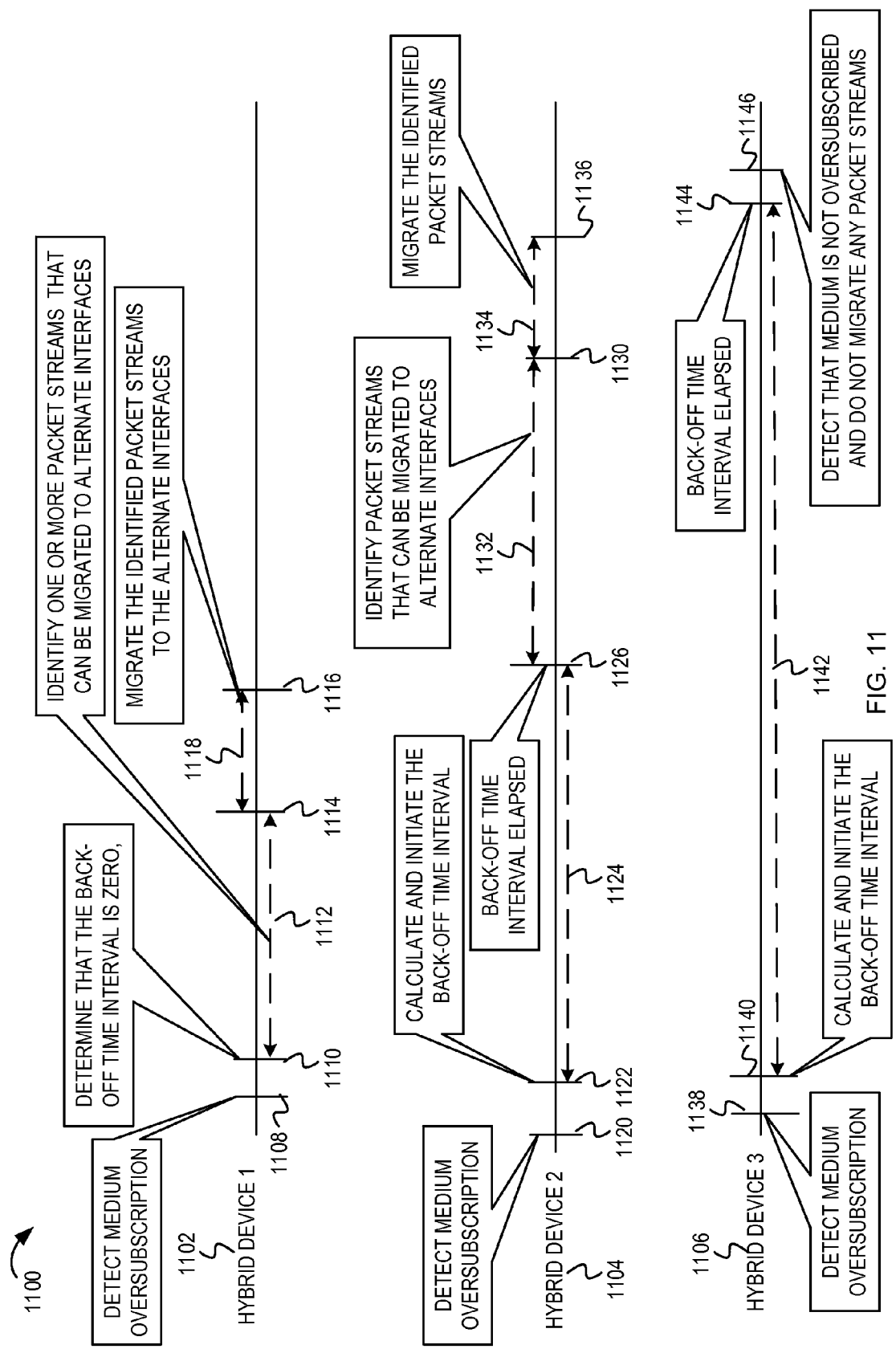
FIG. 11 is an example timing diagram illustrating a back-off mechanism for minimizing race conditions while resolving medium oversubscription without throttling/dropping any packet streams.

FIG. 11 is an example timing diagram illustrating a back-off mechanism for minimizing race conditions while resolving medium oversubscription without throttling/dropping any packet streams. FIG. 11 depicts three timing diagrams for hybrid devices 1102, 1104, and 1106. In FIG. 11, the hybrid devices 1102, 1104, and 1106 share a communication medium. For the shared communication medium and a selected priority level, the hybrid device 1102 sources a packet stream that is associated with the highest stream medium utilization, the hybrid device 1104 sources a packet stream that is associated with the second highest stream medium utilization, while the hybrid device 1106 sources a packet stream that is associated with the third highest stream medium utilization. The hybrid device 1102 detects oversubscription of the shared communication medium at time instant 1108, calculates the back-off time interval associated with the hybrid device 1102. At time instant 110, the hybrid device 1102 determines that the back-off time interval associated with the hybrid device 1102 is zero. The hybrid device 1104 detects oversubscription of the shared communication medium at time instant 1120 and calculates the back-off time interval associated with the hybrid device 1104 at time instant 1122. Likewise, the hybrid device 1106 detects oversubscription of the shared communication medium at time instant 1138 and calculates the back-off time interval associated with the hybrid device 1106 at time instant 1140. With reference to FIG. 7C, the hybrid devices 1102, 1104, and 1106 may determine (at time instants 1110, 1122, and 1138 respectively) that the medium utilization of the shared communication medium lies between the recommended maximum medium utilization threshold 752 and the first intermediate medium utilization threshold 754 (i.e., the threshold X1). Consequently, in one example (as described above in FIG. 7C), the hybrid devices 1102, 1104, and 1106 may determine to resolve medium oversubscription (e.g., by shuffling one or more packet streams) without throttling or dropping any packet streams, as will be described below.

In some implementations, because the hybrid devices 1102, 1104, and 1106 share a communication medium, the hybrid devices 1102, 1104, and 1106 may detect oversubscription of the shared communication medium almost simultaneously. In other implementations, the hybrid devices 1102, 1104, and 1106 may not detect the medium oversubscription simultaneously but may instead detect medium oversubscription at different time instants and within a threshold detection interval. For example, all the hybrid devices 1102, 1104, and 1106 may detect oversubscription of the shared communication medium within 2 seconds. At time instant 1110, the hybrid device 1102 calculates and determines that the back-off time interval associated with the hybrid device 1102 is zero (e.g., because the hybrid device 1102 sources a packet stream that is associated with the highest stream medium utilization). Consequently, the hybrid device 1102 initiates packet flow re-ordering operations described above with reference to FIGS. 3-6. After the hybrid device 1104 detects medium oversubscription at time instant 1120, the hybrid device 1104 calculates and initiates the back-off time interval 1124 at time instant 1122. After the hybrid device 1106 detects medium oversubscription at time instant 1138, the hybrid device 1106 calculates and initiates the back-off time interval 1142 at time instant 1140. The back-off time interval 1124 associated with the hybrid device 1104 is shorter than the back-off time interval 1142 associated with the hybrid device 1106 because the hybrid device 1104 sources a packet stream that is associated with the second highest stream medium utilization, while the hybrid device 1106 sources a packet stream that is associated with the third highest stream medium utilization. During the time interval 1112 (between time instants 1110 and 1114), the hybrid device 1102 identifies one or more packet streams that can be migrated to alternate network interfaces. The hybrid device 1102 then migrates the one or more packet streams to the alternate network interfaces during time interval 1118 (between time instants 1114 and 1116).

At time instant 1126, the hybrid device 1104 determines that the back off time interval 1124 has elapsed. The time instant 1126 can typically occur after the hybrid device 1102 has identified and migrated one or more packet streams to alternate network interfaces (e.g., after the time instant 1116). After the back-off time interval elapses (at the time instant 1126), the hybrid device 1102 identifies one or more of its packet streams that can be migrated to alternate network interfaces during a time interval 1132 (between time instants 1126 and 1130) and. The hybrid device 1104 then migrates the one or more packet streams to the alternate network interfaces during time interval 1134 (between time instants 1130 and 1136).

At time instant 1144, the hybrid device 1106 determines that the back off time interval 1142 has elapsed. The time instant 1144 occurs after the hybrid devices 1102 and 1104 have each identified and migrated one or more packet streams to alternate network interfaces (e.g., after the time instant 1136). After the back-off time interval 1144 elapses (at the time instant 1144), the hybrid device 1106 calculates the medium utilization of the shared communication medium. At time instant 1146, the hybrid device 1106 and determines that the shared communication medium is not oversubscribed. Consequently, the hybrid device 1106 determines not to execute the packet flow re-ordering operations and determines not to migrate any of its packet streams.

The timing diagram of FIG. 11 depicted a back-off mechanism for eliminating medium oversubscription when the communication medium is slightly oversubscribed. With reference to the example of FIG. 7C, the operations of FIG. 11 may be executed when the medium utilization of the shared communication medium is greater than the recommended maximum medium utilization threshold 752 but less than the first intermediate medium utilization threshold 754. Thus, as described above in FIG. 11, the medium oversubscription could be eliminated by shifting one or more packet streams at one (preferably the lowest) priority level. However, in some implementations, the shared communication medium may be severely oversubscribed. With reference to the example FIG. 7C, the medium utilization of the shared communication medium may lie between the third intermediate medium utilization threshold 758 (i.e., the threshold X3) and the 100% medium utilization threshold 760. In this scenario, the hybrid devices may drop packet streams associated with low priority levels and may execute the packet flow re-ordering operations for packet streams associated with high priority levels, as will be described below in FIG. 12.

Figure 12:
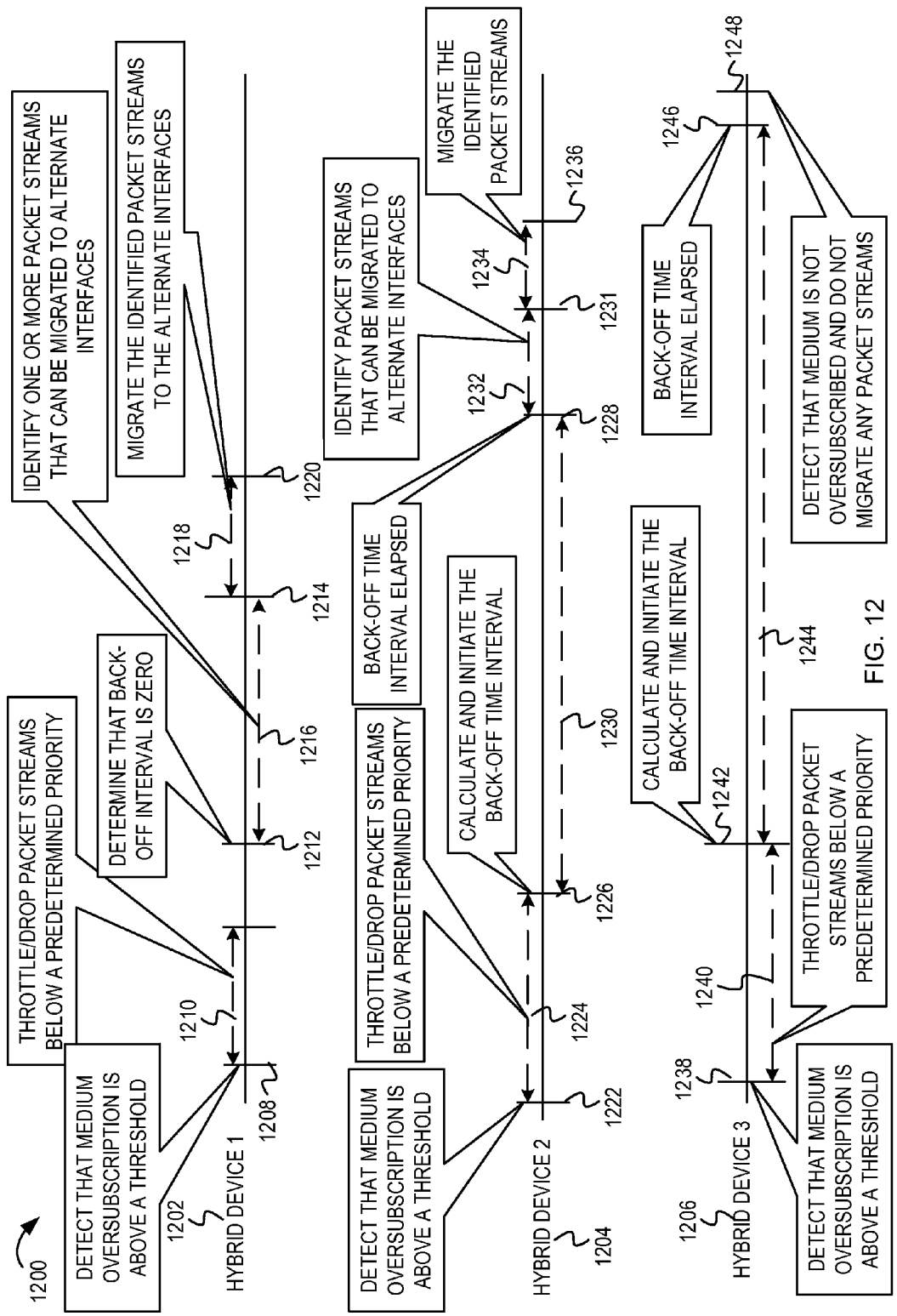
FIG. 12 is an example timing diagram illustrating a second embodiment of a back-off mechanism for minimizing race conditions in balancing medium utilization.

FIG. 12 is an example timing diagram illustrating a second embodiment of a back-off mechanism for minimizing race conditions in balancing medium utilization. FIG. 12 depicts the hybrid devices 1202, 1204, and 1206 that share a communication medium. For the shared communication medium, the hybrid device 1202 sources a packet stream that is associated with the highest stream medium utilization, the hybrid device 1204 sources a packet stream that is associated with the second highest stream medium utilization, while the hybrid device 1206 sources a packet stream that is associated with the third highest stream medium utilization. At time instants 1208, 1222, and 1238, the hybrid devices 1202, 1204, and 1206 respectively detect oversubscription of the shared communication medium and determine that the medium utilization overshoot associated with the communication medium is greater than a predetermined threshold (e.g., the third intermediate medium utilization threshold 758 of FIG. 7C). The hybrid devices 1202, 1204, and 1206 determine to execute packet flow re-ordering operations for packet streams associated with a predetermined priority level (e.g., a high priority level such as priority level P3 of FIG. 7C) and to drop (or throttle) the packet streams associated with lower priority levels (e.g., the priority levels P0, P1, P2 of FIG. 7C). Consequently, the hybrid device 1202 throttles/drops its packet streams below the predetermined priority level (e.g., described above in FIG. 10) during time interval 1210 that begins at the time instant 1208. Likewise, the hybrid device 1204 throttles/drops its packet streams below the predetermined priority level during time interval 1224 (between the time instants 1222 and 1226). The hybrid device 1206 also throttles/drops its packet streams below the predetermined priority level during time interval 1240 (between the time instants 1238 and 1242).

After the hybrid devices 1202, 1204, and 1206 have throttled/dropped their respective packet streams at the lower priority levels (e.g., the priority levels P0, P1, and P2), the hybrid device 1202 determines that the shared communication medium is still oversubscribed. At time instant 1212, the hybrid device 1202 calculates its back-off time interval and determines that the back-off time interval associated with the hybrid device 1102 is zero. The hybrid device 1204 detects oversubscription of the shared communication medium at time instant 1226, and calculates and initiates its back-off time interval. Likewise, the hybrid device 1206 detects oversubscription of the shared communication medium at time instant 1242, and calculates and initiates its back-off time interval. After the hybrid device 1202 determines that its back-off time interval is zero (at time instant 1212), the hybrid device 1102 initiates packet flow re-ordering operations described above with reference to FIGS. 3-6 for the packet streams at the predetermined priority level. During the time interval 1216 (between time instants 1212 and 1214), the hybrid device 1202 identifies one or more packet streams at the predetermined priority level that can be migrated to appropriate alternate network interfaces. The hybrid device 1202 then migrates the one or more packet streams at the predetermined priority level to the appropriate alternate network interfaces during time interval 1218 (between time instants 1214 and 1220).

At time instant 1228, the hybrid device 1204 determines that its back off time interval 1230 has elapsed. The time instant 1204 at which the back-off time interval 1230 elapses typically occurs after the hybrid device 1202 has identified and migrated one or more packet streams to alternate network interfaces (e.g., after the time instant 1220). After the back-off time interval elapses (at time instant 1228), the hybrid device 1204 identifies one or more of its packet streams at the predetermined priority level that can be migrated to appropriate alternate network interfaces during a time interval 1232 (between time instants 1228 and 1231) and. The hybrid device 1204 then migrates the one or more packet streams to the appropriate alternate network interfaces during time interval 1234 (between time instants 1231 and 1236).

At time instant 1246, the hybrid device 1206 determines that its back off time interval 1244 has elapsed. The time instant 1246 at which the back off time interval 1244 elapses can occur after the hybrid devices 1202 and 1204 have each identified and migrated one or more packet streams to appropriate alternate network interfaces (e.g., after the time instant 1236). After the back-off time interval 1244 elapses, the hybrid device 1206 calculates the medium utilization of the shared communication medium and determines (at time instant 1248) that the shared communication medium is not oversubscribed. Consequently, the hybrid device 1206 determines not to execute the packet flow re-ordering operations and determines not to migrate any of its packet streams at the predetermined priority level.

It should be understood that FIGS. 1-12 are examples meant to aid in understanding embodiments and should not be used to limit embodiments or limit scope of the claims. Embodiments may perform additional operations, fewer operations, operations in a different order, operations in parallel, and some operations differently. Although FIGS. 3-4 depict the network path modification unit 110 migrating packet streams from the current source interface 112 to corresponding one or more alternate network interfaces to balance medium utilization across all the network interfaces and to minimize medium utilization overshoot, embodiments are not so limited. In other embodiments, the network path modification unit 110 can migrate one or more packet streams from the current source interface 112 to corresponding one or more alternate network interfaces in an attempt to maximize the total available headroom (i.e., available bandwidth or the difference between the 100% medium utilization and current medium utilization) across all the communication media, minimize the total medium utilization across all the communication media, balance medium utilization across all the communication media, minimize deviate of medium utilization from a mean (or average) medium utilization, and/or minimize computations. In one example, the network path modification unit 110 can calculate a path metric based on the medium utilization of the current source interface and all the potential source interfaces to consider two of the aforementioned optimization criteria. In some implementations, the path metric (PM) can be defined in accordance with Eq. 2.

$$PM = \left\{C1 * \sum_{k=1}^{N} MU_k\right\} + \left\{C2 * \operatorname{Max}\left(\operatorname{Abs}\left[\frac{\sum_{k=1}^{N} MU_k}{N} - MU_1\right], \ldots \operatorname{Abs}\left[\frac{\sum_{k=1}^{N} MU_k}{N} - MU_N\right]\right)\right\}$$

Eq. 2

With reference to Eq. 2, N represents the number of potential source interfaces, MU represents the medium utilization on a particular interface, and C1 and C2 are weighting factors. The weighting factors can be chosen based on the priorities of the optimization criteria. With reference to Eq. 2, the weighting factor C1 is applied to the total medium utilization across all the communication media (i.e., $\Sigma_{k-1}^{N} MU_k$). The weighting factor C2 is applied to the maximum deviation from mean medium utilization. The weighting factors C1 and C2 can be selected based on whether minimizing the total medium utilization across all the communication media or whether minimizing deviation from mean medium utilization is more important.

FIGS. 3-7B describe the network path modification unit 110 determining whether a packet stream can be migrated to a potential source interface by estimating the medium utilization of the potential source interface as a result of the migration and determining whether the estimated medium utilization of the potential source interface is less than the corresponding medium utilization threshold. However, in some embodiments, the network path modification unit 110 may not be able to migrate the packet stream to any of the potential source interfaces. In other words, migrating the packet stream to any of the potential source interfaces may result in the medium utilization of the potential source interfaces exceeding the corresponding medium utilization thresholds. In this embodiment, the network path modification unit 110 may determine to not migrate the packet stream under consideration but to instead identify other packet streams that can be migrated. To detect such a scenario where a packet stream cannot be migrated from the current source interface, the network path modification unit 110 can construct the medium utilization analysis graph 730 to comprise an additional edge (originating from each of the packet stream nodes) that represent the current source interface. Thus, in addition to computing the estimated medium utilization because of switching the packet stream to the potential source interface represented by an edge, the network path modification unit 110 can record the medium utilization of the current source interface (prior to migrating the packet stream). In other words, the number of edges originating from a packet stream node can be equal to the number of network interfaces of the hybrid device. For each packet stream node, the network path modification unit 110 can select the edge (originating from the packet stream node) that is associated with the smallest path metric. For example, the network path modification unit 110 can designate (as the alternate network interface) one of the potential source interfaces that is associated with the maximum available headroom (e.g., the difference between the estimated medium utilization of the potential source interface and the mean medium utilization). Moreover, it is noted that although FIGS. 3-7C describe the network path modification unit 110 ceasing operations for migrating one or more packet streams associated with the current source interface to one or more corresponding alternate network interfaces after the medium utilization of the current source interface drops below the medium utilization threshold, in other embodiments, the network path modification unit 110 can execute a predetermined number of iterations or can execute the packet flow re-ordering operations described herein for a predetermined time interval.

In some implementations, the network path modification unit 110 can (for each edge in the medium utilization analysis graph 730) record the number of packet streams that need to be migrated to get to that edge. With reference to the medium utilization analysis graph 730 of FIG. 7B, the network path modification unit 110 can determine that for the edge 740A, two packet streams (S5 represented by node 734 and S1 represented by node 732) are to be migrated, for an edge (not shown) originating for the packet stream node 736B representing the packet stream S3, three packet streams (S3, S5, and S1) are to be migrated. After executing trace back operations (described above in block 326 of FIG. 4), the network path modification unit 110 may determine that multiple solutions for balancing medium utilization (e.g., multiple options for migrating one or more packet streams to one or more potential source interfaces) exist. In such a scenario, in some implementations, the network path modification unit 110 can select the solution that involves migrating a minimum number of packet streams. For example, the network path modification unit 110 may identify a first solution that involves migrating packet stream S1 to network interface I/F 2, migrating packet stream S5 to network interface I/F 5, and migrating packet stream S3 to network interface I/F 2. The network path modification unit 110 may identify a second solution that involves migrating packet stream S1 to network interface I/F 2 and migrating packet stream S5 to network interface I/F 2. In this example, the network path modification unit 110 can select the second solution that involves migrating only two packet streams (instead of the first solution that involves migrating three packet streams). In another implementation, the network path modification unit 110 can first select one or more solutions that are associated with migrating the least number of packet streams. If there are multiple solutions that are associated with migrating the least number of packet streams, the network path modification unit 110 can select the solution that is associated with the smallest path metric. In another implementation, the network path modification unit 110 can select the solution that is associated with the least path metric irrespective of the number of packet streams to be migrated.

In some implementations, the network path modification unit 110 may attempt to prune the medium utilization analysis graph 730 after a predetermined number (e.g., a pruning threshold) of packet streams have been analyzed to preclude the medium utilization analysis graph 730 from becoming unwieldy. For example, the pruning threshold may be set to four or another suitable predetermined value. In this example, after the network path modification unit 110 analyses four packet streams, the network path modification unit 110 may determine that the medium utilization of the current source interface has not decreased below the medium utilization threshold. The network path modification unit 110 may also determine that additional packet streams originating from the current source interface should be analyzed (and potentially migrated) to decrease the medium utilization of the current source interface. Accordingly, the network path modification unit 110 can identify a plurality of solutions (e.g., possible combinations in which the previously analyzed packet streams can be migrated to one or more potential source interfaces) and can calculate the path metric associated with each of the plurality of solutions. The network path modification unit 110 can select a predetermined number of solutions that are associated with the best path metric (e.g., the top N solutions with the smallest path metric) and can discard all the other solutions/edges/nodes. The network path modification unit 110 can then continue to analyze the next set of packet streams until the pruning threshold is reached or until the medium utilization of the current source interface drops below the medium utilization threshold.

Although FIG. 2 describes the default network path being selected depending on whether the packet stream is a UDP or a non-UDP packet stream, embodiments are not so limited. In other implementations, the initial path selection unit 106 can comprise a plurality of network path selection rules for each of a plurality of packet stream types. For example, the initial path selection unit 106 can comprise a first set of network path selection rules for UDP packet streams, a second set of network path selection rules for TCP packet streams, a third set of network path selection rules for packet streams associated with other transport layer protocols, etc. Additionally, the network path selection rules may not be selected based on transport layer protocols associated with the packet stream. Instead, the network path selection rules may be selected based on network layer (or other upper layer) protocols (or other suitable characterizations) associated with the packet streams. Furthermore, it is noted that in some implementations, the set of network path rules (e.g., the priority) for selecting the initial network interface (and consequently the default network path) can be determined based on the available capacity of each of the network interfaces for different packet stream types (e.g., TCP packet streams versus UDP packet streams). In some implementations, the available capacity of each of the network interfaces can be compared against corresponding configurable thresholds for a particular packet stream type. The available capacity for a particular packet stream type can be logically evaluated for each network interface to determine which of the network interfaces should be selected as the initial network interface (i.e., to determine the initial network path). For example, if the available capacity of a first communication medium is greater than a first capacity threshold and if the available capacity of a second communication medium is less than a second capacity threshold, the network interface associated with the first communication medium can be selected as the initial network interface for transmitting the packet stream. In other implementations, the network interface priorities for selecting the initial network interface can be arbitrary or randomly selected. It is also noted that the initial path selection rules may be updated in response to continuous/periodic assessment of the occupancy of the communication media by data and control packet transmissions and the available capacity of the communication media after accounting for packet transmissions, impairment, congestion, and other such factors. The initial path selection rules may also be updated in response to detecting the availability of new communication media and in response to network traffic information.

It is noted that although not described and depicted with reference to FIGS. 1-12, the network path modification unit 110 can continuously monitor whether the communication medium (that corresponds to the current source interface) is oversubscribed. For example, with reference to FIG. 10, the network path modification unit 110 can determine whether the communication medium is oversubscribed after dropping and throttling each of the packet streams at the lower priority levels (e.g., after block 916), prior to initiating the back-off interval (prior to block 918), after the back-off time interval elapses (after block 920), after migrating one or more packet streams at the selected priority level (after block 922), etc. If at any point, the network path modification unit 110 determines that the communication medium is not oversubscribed, the network path modification unit 110 can terminate operations for migrating the packet streams and/or for throttling/dropping packet streams. The network path modification unit 110 can then continue to monitor the medium utilization of all the network interfaces to ensure that none of the communication media (associated with the corresponding network interfaces) are oversubscribed.

Furthermore, although FIGS. 8-12 describe the hybrid devices being ranked (and the hybrid devices executing the packet flow re-ordering operations) based which of the hybrid devices source the packet stream with the largest medium utilization, embodiments are not so limited. In other embodiments, the hybrid devices can be ranked (e.g., to determine the back-off time interval) based on the total medium utilization (of each of the hybrid devices) on each of the network interfaces of the hybrid devices. In another embodiment, the hybrid devices may not exchange flow tables but may instead rank all of the hybrid devices based on a predetermined device identifier (e.g., a device identifier, a MAC address of a predetermined network interface, a MAC address, or another suitable address that is broadcast by the hybrid device, etc.).

Although not described herein, it is noted that in some implementations, a centralized hybrid device can execute the operations described herein for selecting the initial network path and for migrating one or more packets streams to appropriate alternate network interfaces. The centralized hybrid device can make path selection and path modification decisions for all the hybrid devices in the hybrid communication network using local information (e.g., information determined by the centralized hybrid device such as capacity of the communication media) and information shared by each of the other hybrid devices (e.g., information from the flow tables). The path selection and modification decisions can then be provided to the hybrid devices. For example, the centralized hybrid device may receive an indication that a packet stream is to be transmitted and one or more characteristics of the packet stream (e.g., whether the packet stream is a UDP or a non-UDP packet stream). Based on knowledge of the capacities of the communication media and the characteristics of the packet stream, the centralized hybrid device can identify the initial network path and communicate an indication of the initial network path to the hybrid device.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable configurable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 13:
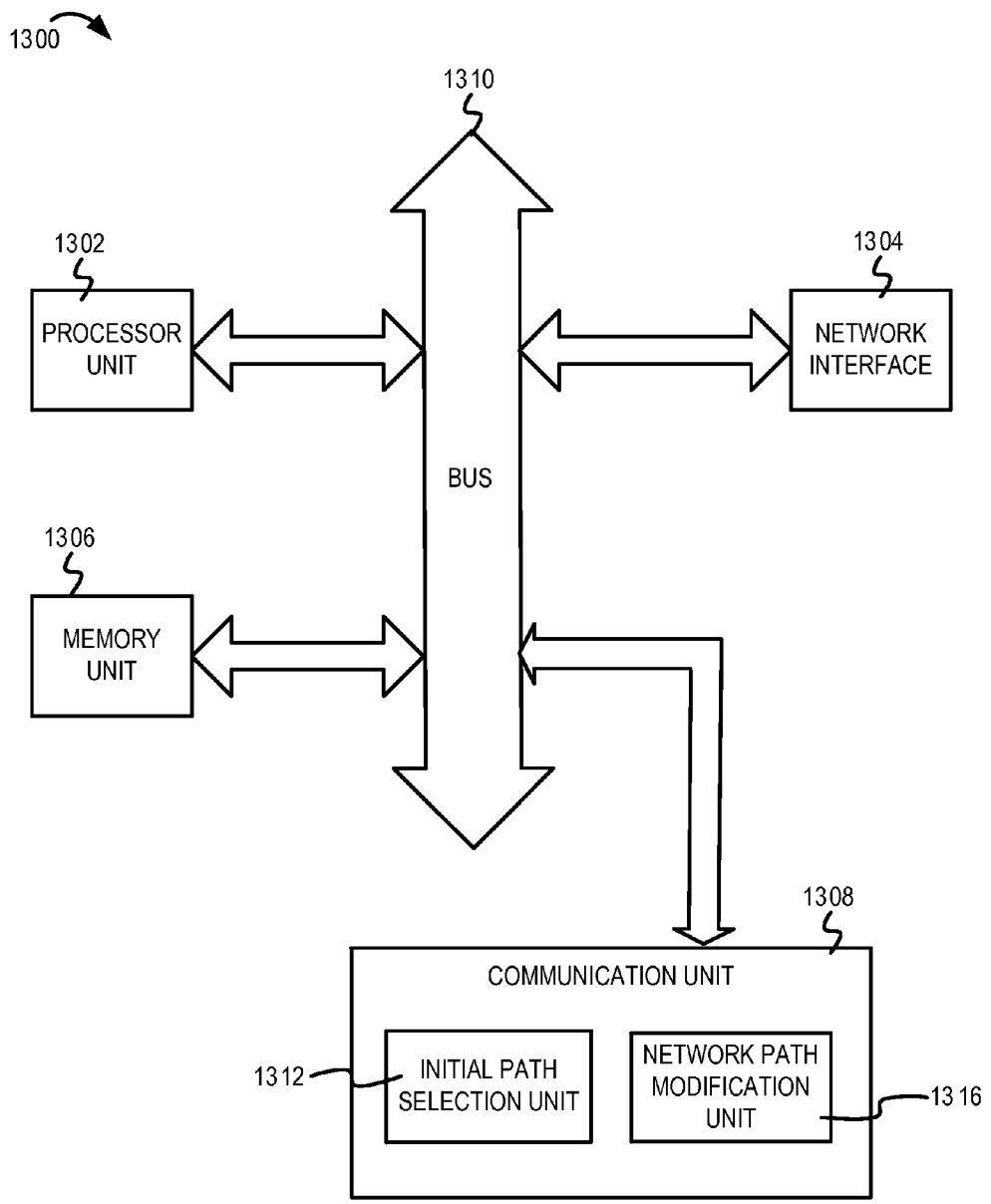
FIG. 13 is a block diagram of one embodiment of an electronic device including a mechanism for automatic path selection in a hybrid communication network.

FIG. 13 is a block diagram of one embodiment of an electronic device 1300 including a mechanism for automatic path selection in a hybrid communication network. In some implementations, the electronic device 1300 may be one of a desktop computer, laptop computer, a tablet computer, a mobile phone, a smart appliance, a powerline communication device, a gaming console, network bridging devices, or other electronic systems comprising a hybrid communication unit configured to communicate across multiple communication networks. The electronic device 1300 includes a processor unit 1302 (possibly including multiple processors, multiple cores, multiple nodes, and/or implementing multi-threading, etc.). The electronic device 1300 includes a memory unit 1306. The memory unit 1306 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1300 also includes a bus 1310 (e.g., PCI, ISA, PCI-Express, Hyper-Transport®, InfiniBand®, NuBus, AHB, AXI, etc.), and network interfaces 1304 that include at least one of a wireless network interface (e.g., a WLAN interface, a Bluetooth® interface, a WiMAX interface, a ZigBee® interface, a Wireless USB interface, etc.) and a wired network interface (e.g., a PLC interface, an Ethernet interface, etc.). In some implementations, the electronic device 1300 can comprise a plurality of network interfaces—each of which couples the electronic device 1300 to a different communication network. For example, the electronic device 1300 can comprise a PLC interface, an Ethernet interface, and a WLAN interface that couple the electronic device 1300 with a powerline communication network, Ethernet, and a wireless local area network respectively.

The electronic device 1300 also includes a communication unit 1308. The communication unit 1308 comprises an initial path selection unit 1312 and a network path modification unit 1316. The initial path selection unit 1312 can implement functionality to select an initial network path for transmitting a packet stream, as described in accordance with FIGS. 1-2. In some implementations, the communication unit 1308 can detect oversubscription of one or the communication media to which the electronic device 1300 is coupled and can execute operations described above in FIGS. 1 and 3-7C to identify and migrate one or more packet streams to alternate network interfaces. In other implementations, the communication unit 1308 can detect oversubscription of one or the communication media, calculate a back-off time interval to avoid race conditions, can execute operations to identify and migrate one or more packet streams to alternate network interfaces, as described above in FIGS. 3-12. Any one of these functionalities may be partially (or entirely) implemented in hardware and/or on the processor unit 1302. For example, the functionality may be implemented with an application specific integrated circuit, in logic implemented in the processor unit 1302, in a co-processor on a peripheral device or card, etc. Further, realizations may include fewer or additional components not illustrated in FIG. 13 (e.g., video cards, audio cards, additional network interfaces, peripheral devices, etc.). The processor unit 1302, the memory unit 1306, and the network interfaces 1304 are coupled to the bus 1310. Although illustrated as being coupled to the bus 1310, the memory unit 1306 may be coupled to the processor unit 1302.

While the embodiments are described with reference to various implementations and exploitations, it will be understood that these embodiments are illustrative and that the scope of the inventive subject matter is not limited to them. In general, techniques for automatic path selection for hybrid communication network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter.

In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
selecting, at a source communication device, a first network interface to communicate with a destination communication device;
determining whether a first medium utilization associated with the first network interface exceeds a first medium utilization threshold; and
if the first medium utilization exceeds the first medium utilization threshold,
analyzing at least one packet stream originating from the first network interface to determine an effect of migrating at least one packet stream to an alternate network interface of the source communication device,
identifying a first packet stream originating from the first network interface to migrate to the alternate network interface, said identifying based, at least in part, on the effect of migrating the first packet stream to the alternate network interface, and
migrating the first packet stream from the first network interface to the alternate network interface.

2. The method of claim 1, wherein, if the first medium utilization associated with the first network interface does not exceed the first medium utilization threshold, the method further comprises:
monitoring medium utilizations associated with a plurality of network interfaces of the source communication device to determine whether a monitored medium utilization associated with one of the plurality of network interfaces exceeds a corresponding medium utilization threshold.

3. The method of claim 1, wherein said selecting the first network interface comprises:
selecting the first network interface from a plurality of network interfaces based, at least in part, on at least one of a packet stream type associated with the first packet stream, a priority level associated with the first packet stream, an available link capacity associated with the first network interface, the first medium utilization associated with the first network interface, a stream medium utilization associated with the first packet stream, and a priority level associated with the first network interface.

4. The method of claim 3, wherein the packet stream type indicates whether the first packet stream is a user datagram protocol (UDP) packet stream or a non-UDP packet stream.

5. The method of claim 1, wherein said selecting the first network interface comprises:
determining a link capacity associated with each of the first network interface and a second network interface of the source communication device; and
in response to determining that the link capacity associated with each of the first network interface and the second network interface exceeds a link capacity threshold,
selecting the first network interface based, at least in part, on one of a packet stream type associated with the first packet stream, a priority level of the first network interface and the second network interface, and an availability of the first network interface and the second network interface.

6. The method of claim 5, wherein, in response to determining that the link capacity associated with each of the first network interface and the second network interface does not exceed the link capacity threshold, the method further comprises:
selecting the first network interface in response to determining that the link capacity associated with the first network interface exceeds the link capacity associated with the second network interface.

7. The method of claim 1, further comprising:
determining that the first network interface and a second network interface are each associated with a corresponding medium utilization that exceeds a corresponding medium utilization threshold;
determining, for each network interface of the first network interface and the second network interface, a medium utilization overshoot associated with the network interface as a difference between the corresponding medium utilization associated with the network interface and the corresponding medium utilization threshold associated with the network interface;
determining that the medium utilization overshoot associated with the first network interface exceeds the medium utilization overshoot associated with the second network interface; and
selecting the first network interface in response to determining that the medium utilization overshoot associated with the first network interface exceeds the medium utilization overshoot associated with the second network interface.

8. The method of claim 1, wherein said analyzing at least one packet stream comprises analyzing a plurality of packet streams originating from the first network interface based, at least in part, on a stream medium utilization associated with each of the plurality of packet streams.

9. The method of claim 1, wherein analyzing at least one packet stream originating from the first network interface comprises:
selecting the first packet stream associated with a first stream medium utilization;
identifying a first potential network interface of the source communication device to migrate the first packet stream from the first network interface to the first potential network interface;
estimating a first potential medium utilization associated with the first potential network interface if the first of packet stream is migrated from the first network interface to the first potential network interface; and
determining whether the first potential medium utilization associated with the first potential network interface exceeds a corresponding medium utilization threshold associated with the first potential network interface if the first of the plurality of packet stream is migrated to the first potential network interface.

10. The method of claim 9, further comprising:
in response to determining that the first potential medium utilization associated with the first potential network interface does not exceed the corresponding medium utilization threshold associated with the first potential network interface and that a second potential medium utilization associated with a second potential network interface exceeds a corresponding medium utilization threshold associated with the second potential network interface,
determining not to migrate the first packet stream to the second potential network interface;
in response to determining that the first potential medium utilization associated with the first potential network interface and the second potential medium utilization associated with the second potential network interface exceed corresponding medium utilization thresholds associated with the first and second potential network interfaces, respectively,
determining that the first of the plurality of packet stream cannot be migrated; and
selecting a second packet stream associated with a second stream medium utilization to determine whether the second packet stream can be migrated from the first network interface to another network interface of the source communication device.

11. The method of claim 9, wherein,
in response to determining that the first potential medium utilization associated with the first potential network interface does not exceed the corresponding medium utilization threshold associated with the first potential network interface,
determining whether an estimated medium utilization associated with the first network interface exceeds the corresponding medium utilization threshold associated with the first network interface if the first packet stream is migrated from the first network interface to the first potential network interface; and
in response to determining that the estimated medium utilization associated with the first network interface does not exceed the corresponding medium utilization threshold associated with the first network interface,
migrating the first packet stream from the first network interface to the first potential network interface, wherein the first potential network interface is the alternate network interface.

12. The method of claim 11, further comprising:
in response to determining that the estimated medium utilization associated with the first network interface exceeds the corresponding medium utilization threshold,
determining whether to migrate a second packet stream associated with a second stream medium utilization from the first network interface to another network interface.

13. The method of claim 1, wherein said analyzing at least one packet stream originating from the first network interface comprises:
identifying a potential network interface of the source communication device to migrate the first packet stream from the first network interface to the potential network interface;
simulating migration of the first packet stream from the first network interface to the potential network interface;
estimating a new medium utilization associated with the potential network interface in response to simulating migration of the first packet stream from the first network interface to the potential network interface; and
determining whether to migrate the first packet stream from the first network interface to the potential network interface based, at least in part, on determining whether the new medium utilization exceeds a corresponding medium utilization threshold associated with the potential network interface.

14. The method of claim 13, further comprising selecting the potential network interface from one of:

at least one network interface of the source communication device that does not include the first network interface;
a plurality of network interfaces of the source communication device that includes the first network interface;
at least one network interface of the source communication device that is associated with a corresponding medium utilization that does not exceed a corresponding medium utilization threshold; and
at least one network interface of the source communication device that is compatible with the destination communication device.

15. The method of claim 13, further comprising:
determining to migrate the first packet stream from the first network interface to the potential network interface if the potential network interface is associated with a lowest new medium utilization from among at least one potential network interface, in response to determining that the new medium utilization associated with the potential network interface does not exceed the corresponding medium utilization threshold.

16. The method of claim 1, wherein said identifying the first packet stream comprises:
determining a minimum number of packet streams originating from the first network interface to migrate to at least one alternate network interface to reduce the first medium utilization associated with the first network interface below the first medium utilization threshold while maintaining a corresponding medium utilization associated with the at least one alternate network interface below a corresponding medium utilization threshold.

17. The method of claim 1, wherein said identifying the first packet stream comprises:
identifying the first packet stream originating from the first network interface to migrate to the alternate network interface to reduce the first medium utilization associated with the first network interface below the first medium utilization threshold while maintaining a corresponding medium utilization associated with the alternate network interface below a corresponding medium utilization threshold, wherein a priority level associated with the first packet stream is lower than a priority level associated with at least a second packet stream that originates from the first network interface.

18. The method of claim 1, wherein said analyzing at least one packet stream and said identifying the first packet stream comprise:
determining a plurality of migration solutions based, at least in part, on simulating migration of at least one packet stream originating from the first network interface to at least one potential network interface of the source communication device, wherein each migration solution represents migration of a combination of at least one or more of the subset of the packet stream to at least one potential network interface;
determining a first path metric associated with a first migration solution based, at least in part, on one of a first stream medium utilization associated with the first packet stream that constitutes the first migration solution, an estimated medium utilization associated with a first potential network interface that constitutes the first migration solution, and an available link capacity associated with the first potential network interface; and
wherein said migrating the first packet stream from the first network interface to the alternate network interface includes migrating the first packet stream from the first network interface to the first potential network interface.

19. The method of claim 1, wherein said analyzing at least one packet stream and said identifying the first packet stream comprise:
determining a plurality of migration solutions based, at least in part, on simulating migration of at least one packet stream originating from the first network interface to at least one potential network interface of the source communication device, wherein each migration solution represents migration of at least one packet stream to at least one potential network interface;
identifying, for a first migration solution and a second migration solution, a number of packet streams that are to be migrated from the first network interface in accordance with the first and second migration solution;
in response to determining that the first migration solution and the second migration solution are each associated with migrating a first number of packet streams from the first network interface,
selecting the first migration solution that is associated with a first path metric, wherein the first path metric associated with the first migration solution is determined based, at least in part, on at least one of a stream medium utilization associated with the first packet stream that constitutes the first migration solution, an estimated medium utilization associated with a first potential network interface that constitutes the first migration solution, and an available link capacity associated with the first potential network interface; and
migrating the first packet stream from the first network interface to the first potential network interface, wherein the first potential network interface is the alternate network interface.

20. A method comprising:
selecting, at a source communication device, a first network interface to communicate with a destination communication device;
determining whether a first medium utilization associated with the first network interface exceeds a first medium utilization threshold; and
if the first medium utilization associated with the first network interface exceeds the first medium utilization threshold,
identifying at least one packet stream associated with a first priority level and originating from the first network interface,
analyzing at least one packet stream originating from the first network interface at the first priority level to determine an effect of migrating at least one packet stream to an alternate network interface of the source communication device,
identifying a first packet stream originating from the first network interface at the first priority level to migrate to the alternate network interface, said identifying based, at least in part, on the effect of migrating at least one packet stream to at least one alternate network interface, and
migrating the first packet stream at the first priority level from the first network interface to the alternate network interface.

21. The method of claim 20, wherein,
said identifying the first packet stream at the first priority level to migrate to the alternate network interface comprises:

determining whether any of the packet streams that are associated with the first priority level can be migrated to another network interface of the source communication device; and in response to determining that the first packet stream can be migrated to another network interface, determining to analyze the first packet stream that is associated with a first stream medium utilization to identify the alternate network interface to migrate the first packet stream from the first network interface to the alternate network interface.

22. The method of claim 21, wherein, in response to determining that none of the packet streams at the first priority level can be migrated to the alternate network interface, the method further comprises:

determining whether the first packet stream at the first priority level can be throttled;

in response to determining that the first packet stream can be throttled, varying a transmission parameter associated with the first packet stream to throttle the first packet stream in accordance with minimum performance measurements associated with the first packet stream; and in response to determining that none of the packet streams at the first priority level can be throttled, dropping of the first packet stream.

23. The method of claim 22, wherein said determining whether the first packet stream at the first priority level can be throttled comprises:

determining that a second packet stream originating from the first network interface and associated with a second priority level has been throttled, wherein the second priority level is lower than the first priority level, or determining that the second packet stream originating from the first network interface and associated with the second priority level has been dropped.

24. The method of claim 20, further comprising:

determining a new medium utilization associated with the first network interface in response to migrating the first packet stream at the first priority level from the first network interface to the alternate network interface;

determining whether the new medium utilization associated with the first network interface exceeds the first medium utilization threshold; and in response to determining that the new medium utilization associated with the first network interface exceeds the first medium utilization threshold, selecting a second priority level to analyze a second packet stream originating from the first network interface.

25. The method of claim 20, further comprising:

determining a medium utilization overshoot associated with the first network interface as a difference between the first medium utilization associated with the first network interface and the first medium utilization threshold associated with the first network interface;

determining that the medium utilization overshoot associated with the first network interface exceeds an overshoot threshold associated with the first network interface; and selecting the first priority level to analyze at least one packet stream originating from the first network interface, wherein the first priority level corresponds to the overshoot threshold.

26. The method of claim 20, wherein said identifying the first packet stream comprises:

dropping a second packet stream originating from the first network interface, wherein the second packet stream is associated with a second priority level that is lower than the first priority level;

determining whether a new medium utilization associated with the first network interface exceeds the first medium utilization threshold associated with the first network interface, in response to dropping the second packet stream; and in response to determining that the new medium utilization associated with the first network interface exceeds the first medium utilization threshold, identifying the first packet stream originating from the first network interface at the first priority level to migrate to the alternate network interface.

27. The method of claim 20, further comprising:

determining stream medium utilizations associated with the first packet stream and a second packet stream that are at the first priority level; and organizing the first packet stream and the second packet stream at first priority level in descending order of the stream medium utilizations.

28. A first communication device comprising:

a plurality of network interfaces; and a network path modification unit coupled with the plurality of network interfaces, the network path modification unit configured to:

select a first network interface from the plurality of network interfaces to communicate with a destination communication device;

determine whether a first medium utilization associated with the first network interface exceeds a first medium utilization threshold; and if the first medium utilization associated with the first network interface exceeds the first medium utilization threshold, analyze at least one packet stream originating from the first network interface to determine an effect of migrating at least one packet stream to an alternate network interface of the first communication device, identify a first packet stream originating from the first network interface to migrate to the alternate network interface based, at least in part, on the effect of migrating the first packet stream to the alternate network interface; and migrate the first packet stream from the first network interface to the alternate network interface.

29. The first communication device of claim 28, wherein the network path modification unit configured to select the first network interface from the plurality of network interfaces of the communication device comprises the network path modification unit configured to:

determine a link capacity associated with each of the first network interface and a second of network interface of the first communication device; and in response to determining that the link capacity associated with each of the first network interface and the second network interface exceeds a link capacity threshold, select the first network interface based, at least in part, on one of a packet stream type associated with the first packet stream, a priority level of the first network interface and the second network interface, and an availability of the first network interface and the second network interface.

30. The first communication device of claim 28, wherein the network path modification unit configured to analyze at least one packet stream comprises the network path modification unit configured to:
- identify a potential network interface of the first communication device to migrate the first packet stream from the first network interface to the potential network interface;
- simulate migration of the first packet stream from the first network interface to the potential network interface;
- estimate a new medium utilization associated with the potential network interface in response to simulating migration of the first packet stream from the first network interface to the potential network interface; and
- determine whether to migrate the first packet stream from the first network interface to the potential network interface based, at least in part, on determining whether the new medium utilization exceeds a corresponding medium utilization threshold associated with the potential network interface.

31. The first communication device of claim 28, wherein the network path modification unit configured to analyze at least one packet stream and identify the first packet stream comprises the network path modification unit configured to:
- determine a plurality of migration solutions based, at least in part, on simulating migration of at least one packet stream originating from the first network interface to at least one potential network interface of the first communication device, wherein each migration solution represents migration of at least one packet stream to at least one potential network interface;
- determine a first path metric associated with a first migration solution based, at least in part, on one of a stream medium utilization associated with the first packet stream that constitutes the first migration solution, an estimated medium utilization associated with a first potential network interface that constitutes the first migration solution, and an available link capacity associated with the first potential network interface; and
- wherein the network path modification unit configured to migrate the first packet stream from the first network interface to the alternate network interface comprises the network path modification unit configured to migrate the first packet stream from the first network interface to the first potential network interface.

32. A first communication device comprising:
a plurality of network interfaces; and
a network path modification unit coupled with the plurality of network interfaces, the network path modification unit configured to:
- select a first network interface from the plurality of network interfaces to communicate with a destination communication device;
- determine whether a first medium utilization associated with the first network interface exceeds a first medium utilization threshold; and
- if the first medium utilization associated with the first network interface exceeds the first medium utilization threshold,
  - identify at least one packet stream associated with a first priority level and originating from the first network interface,
  - analyze at least one packet stream originating from the first network interface at the first priority level to determine an effect of migrating at least one packet stream to an alternate network interface of the first communication device,
  - identify a first packet stream originating from the first network interface at the first priority level to migrate to the alternate network interface based, at least in part, on the effect of migrating the first packet stream to the alternate network interface, and
  - migrate the first packet stream at the first priority level from the first network interface to the alternate network interface.

33. The first communication device of claim 32, wherein the network path modification unit configured to identify the first packet stream at the first priority level to migrate to the alternate network interface comprises the network path modification unit configured to:
- determine whether any of the packet streams that are associated with the first priority level can be migrated to another network interface of the first communication device; and
- in response to determining that the first packet stream can be migrated to another network interface,
  - determine to analyze the first packet stream that is associated with a first stream medium utilization to identify the alternate network interface to migrate the first packet stream from the first network interface to the alternate network interface.

34. The first communication device of claim 33, wherein, in response to determining that none of the packet streams at the first priority level can be migrated to another network interface, the network path modification unit is further configured to:
- determine whether the first packet stream at the first priority level can be throttled;
- vary a transmission parameter associated with the first packet stream to throttle the first packet stream in accordance with minimum performance measurements associated with the first packet stream in response to determining that the first packet stream can be throttled; and
- drop the first packet stream in response to determining that none of the packet streams at the first priority level can be throttled.

35. The first communication device of claim 32, wherein the network path modification unit is further configured to:
- determine a new medium utilization associated with the first network interface in response to migrating the first packet stream at the first priority level from the first network interface to alternate network interface;
- determine whether the new medium utilization associated with the first network interface exceeds the first medium utilization threshold; and
- select a second priority level to analyze a second packet stream originating from the first network interface in response to determining that the new medium utilization associated with the first network interface exceeds the first medium utilization threshold.

36. A non-transitory machine-readable storage medium having instructions stored therein, which when executed by a processor causes the processor to perform operations that comprise:
- selecting, at a source communication device, a first network interface to communicate with a destination communication device;
- determining whether a first medium utilization associated with the first network interface exceeds a first medium utilization threshold;
- if the first medium utilization associated with the first network interface exceeds the first medium utilization threshold, analyzing at least one packet stream originating from the first network interface to determine an effect of migrating at least one packet stream to at least one alternate network interface;

identifying a first packet stream originating from the first network interface to migrate to an alternate network interface said identifying based, at least in part, on the effect of migrating the first packet stream to the alternate network interface;

migrating the first packet stream from the first network interface to the alternate network interface.

37. The non-transitory machine-readable storage medium of claim 36, wherein selecting the first network interface comprises:

determining a link capacity associated with each of the first network interface and a second network interface of the source communication device; and in response to determining that the link capacity associated with each of the first network interface and the second network interface exceeds a link capacity threshold, selecting the first network interface based, at least in part, on one of a packet stream type associated with the first packet stream, a priority level of the first network interface and the second network interface, and an availability of the first network interface and the second network interface.

38. The non-transitory machine-readable storage medium of claim 36, wherein analyzing at least one packet stream comprises:

identifying a potential network interface to migrate the first packet stream from the first network interface to the potential network interface;

simulating migration of the first packet stream from the first network interface to the potential network interface;

estimating a new medium utilization associated with the potential network interface in response to simulating migration of the first packet stream from the first network interface to the potential network interface; and determining whether to migrate the first packet stream from the first network interface to the potential network interface based, at least in part, on determining whether the new medium utilization exceeds a corresponding medium utilization threshold associated with the potential network interface.

39. The non-transitory machine-readable storage medium of claim 36, wherein analyzing at least one packet stream and identifying the first packet stream comprises:

determining a plurality of migration solutions based, at least in part, on simulating migration of at least one packet stream originating from the first network interface to at least one potential network interface of the source communication device, wherein each migration solution represents migration of at least one packet stream to at least one potential network interface;

determining a first path metric associated with a first migration solution based, at least in part, on one of a stream medium utilization associated with the first packet stream that constitutes the first migration solution, an estimated medium utilization associated with a first potential network interface that constitutes the first migration solution, and an available link capacity associated with the first potential network interface; and wherein said migrating the first packet stream from the first network interface to the alternate network interface includes migrating the first packet stream from the first network interface to the first potential network interface.

\* \* \* \* \*